(12) United States Patent
 Uhrenholt

(10) Patent No.: US 11,830,101 B2
(45) Date of Patent: Nov. 28, 2023

(54) GRAPHICS PROCESSORS

(71) Applicant: Arm Limited, Cambridge (GB)

(72) Inventor: Olof Henrik Uhrenholt, Lomma (SE)

(73) Assignee: Arm Limited, Cambridge (GB)

( * ) Notice: Subject to any disclaimer, the term of this patent is extended or adjusted under 35 U.S.C. 154(b) by 67 days.

(21) Appl. No.: 16/931,754

(22) Filed: Jul. 17, 2020

(65) Prior Publication Data
US 2022/0020108 A1    Jan. 20, 2022

(51) Int. Cl.
| G06T 1/20 | (2006.01) |
| G06F 9/30 | (2018.01) |
| G06F 9/38 | (2018.01) |
| G06F 9/48 | (2006.01) |

(52) U.S. Cl.
CPC ............ *G06T 1/20* (2013.01); *G06F 9/30098* (2013.01); *G06F 9/3838* (2013.01); *G06F 9/485* (2013.01)

(58) Field of Classification Search
CPC ..... G06T 1/20; G06F 9/30098; G06F 9/3838; G06F 9/485
See application file for complete search history.

(56) References Cited

U.S. PATENT DOCUMENTS

| 2013/0132711 | A1* | 5/2013 | Shah ....................... G06F 9/461 |
| | | | 712/228 |
| 2014/0184617 | A1 | 7/2014 | Palmer et al. |
| 2017/0024848 | A1* | 1/2017 | Harris ....................... G06F 8/41 |
| 2018/0211436 | A1* | 7/2018 | Nystad ................... G06F 9/3826 |
| 2018/0293692 | A1* | 10/2018 | Koker ..................... G06F 9/461 |
| 2019/0005604 | A1 | 1/2019 | Acharya et al. |
| 2019/0079775 | A1* | 3/2019 | Liland ................... G06F 9/3851 |
| 2019/0088009 | A1 | 3/2019 | Forey et al. |
| 2019/0163527 | A1 | 5/2019 | Acharya et al. |
| 2020/0065095 | A1 | 2/2020 | Underwood et al. |
| 2020/0286201 | A1* | 9/2020 | Valerio ..................... G06T 1/60 |
| 2022/0044467 | A1* | 2/2022 | Woop ..................... G06T 15/005 |

OTHER PUBLICATIONS

Non-Final Office Action dated Apr. 15, 2021, U.S. Appl. No. 16/931,719.

(Continued)

*Primary Examiner* — Sing-Wai Wu
*Assistant Examiner* — Khoa Vu
(74) *Attorney, Agent, or Firm* — Vierra Magen Marcus LLP

(57) ABSTRACT

To suspend the processing for a group of one or more execution threads currently executing a shader program for an output being generated by a graphics processor, the issuing of shader program instructions for execution by the group of one or more execution threads is stopped, and any outstanding register-content affecting transactions for the group of one or more execution threads are allowed to complete. Once all outstanding register-content affecting transactions for the group of one or more execution threads have completed, the content of the registers associated with the threads of the group of one or more execution threads, and a set of state information for the group of one or more execution threads, including at least an indication of the last instruction in the shader program that was executed for the threads of the group of one or more execution threads, are stored to memory.

24 Claims, 6 Drawing Sheets

(56) References Cited

OTHER PUBLICATIONS

Non-Final Office Action dated Apr. 15, 2021, U.S. Appl. No. 16/931,731.
Uhrenholt, "Graphics Processing Systems," U.S. Appl. No. 16/931,719, filed Jul. 17, 2020.
Uhrenholt, "Graphics Processing Systems," U.S. Appl. No. 16/931,731, filed Jul. 17, 2020.
Response to Non-Final Office Action dated Jul. 15, 2021, U.S. Appl. No. 16/931,719.
Response to Non-Final Office Action dated Jul. 15, 2021, U.S. Appl. No. 16/931,731.
Notice of Allowance dated Aug. 9, 2021, U.S. Appl. No. 16/931,731.
Notice of Allowance dated Aug. 10, 2021, U.S. Appl. No. 16/931,719.

* cited by examiner

GRAPHICS PROCESSORS

BACKGROUND

The technology described herein relates to the operation of graphics processors (graphics processing units (GPUs), and in particular to the suspending and resuming of processing operations on a graphics processor.

Many graphics processors now include one or more processing (shader) cores, that execute, inter alia, programmable processing stages, commonly referred to as "shaders", of a graphics processing pipeline that the graphics processor implements. For example, a graphics processing pipeline may include one or more of, and typically all of: a geometry shader, a vertex shader and a fragment (pixel) shader. These shaders are programmable processing stages that execute shader programs on input data values to generate a desired set of output data, such as appropriately shaded and rendered fragment data in the case of a fragment shader, for processing by the rest of the graphics processing pipeline and/or for output.

It is also known to use graphics processors and graphics processing pipelines, and in particular the shader operation of a graphics processor and graphics processing pipeline, to perform more general computing tasks, e.g. in the case where a similar operation needs to be performed in respect of a large volume of plural different input data values. These operations are commonly referred to as "compute shading" operations and a number of specific compute APIs, such as OpenCL and Vulkan, have been developed for use when it is desired to use a graphics processor and a graphics processing pipeline to perform more general computing operations. Compute shading is used for computing arbitrary information. It can be used to process graphics-related data, if desired, but is generally used for tasks not directly related to performing graphics processing.

A graphics processor shader core is thus a processing unit that performs processing by running (typically small) programs for each "work item" in an output to be generated. In the case of generating a graphics output, such as a render target, such as a frame to be displayed, a "work item" in this regard is usually a vertex or a sampling position (e.g. in the case of a fragment shader). In the case of compute shading operations, each "work item" in the output being generated will be, for example, the data instance (item) in the work "space" that the compute shading operation is being performed on.

In graphics processor shader operation, including in compute shading operation, each work "item" will be processed by means of an execution thread which will execute the instructions in the shader program in question for the work item in question.

In order to execute shader programs, a graphics processor (graphics processing unit (GPU)) will include an appropriate execution unit or units (circuit or circuits) for that purpose. The execution unit(s) will include programmable processing circuit(s) for executing shader programs (the "shaders" of graphics processing pipeline).

The actual data processing operations that are performed by the shader execution unit when executing that shader program are usually performed by respective functional units (circuits), such as arithmetic units (circuits), of the execution unit, in response to, and under the control of, the instructions in the (shader) program being executed. Thus, for example, appropriate functional units, such as arithmetic units, will perform data processing operations in response to and as required by instructions in a (shader) program being executed.

When executing an instruction in a program, the execution unit (e.g. the appropriate functional unit, such as an arithmetic unit, of the execution unit) will typically read one or more input data values (operands), perform a processing operation using those input data values to generate an output data value, and then return the output data value, e.g. for further processing by subsequent instructions in the program being executed and/or for output (for use otherwise than during execution of the program being executed).

The input data values to be used when executing the instruction will typically be stored "locally" in an appropriate set of registers (a register file) of and/or accessible to the execution (functional) unit, and the output data value(s) generated by the execution (functional) unit when executing the instruction will correspondingly be written back to that storage (register file).

To facilitate this operation, each execution thread, when executing a shader program, will correspondingly be allocated a set of one or more registers for use by that thread when executing the shader program.

Thus when executing an instruction, an execution thread will read input data values (operands) from a register or registers of a set of one or more registers allocated to that thread, and write its output value(s) back to a register or registers of the thread's register allocation.

The data will be loaded into the registers, and written out from the registers, from and to an appropriate memory system of or accessible to the graphics processor (e.g. via an appropriate cache system (cache hierarchy)).

It is becoming increasingly common for graphics processors to be used in data processing systems in which the graphics processor is, in effect, shared between multiple applications running concurrently. For example, this can arise in data processing systems that support hardware virtualisation using "time-slicing", in which a given graphics processor may be performing graphics processing for multiple applications (multiple virtual "systems") that are executing concurrently in a virtualised environment, with the graphics processor being shared between the different applications/systems in a time division-based manner.

In such time-divided "shared" operations, a graphics processor may be generating a render output for a first application, but then be required to switch to producing a render output for another application before it has completed the first render output. In that case therefore, the graphics processor will be required to suspend its processing of the first render output, so as to be able to switch to generating the second render output, but in such a way that it can then subsequently resume the processing of the first render output when the graphics processor returns to performing processing for the application that requires the first render output. This process will be repeated over time, as the graphics processor switches between generating render outputs for different applications that are "sharing" the graphics processor in a time-division manner.

The Applicants accordingly believe that there is a need for a mechanism for suspending processing of a given output on a graphics processor in such a way that the processing of the output can then be resumed at a later time, and desirably in an efficient and relatively quick (in a low latency) manner.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
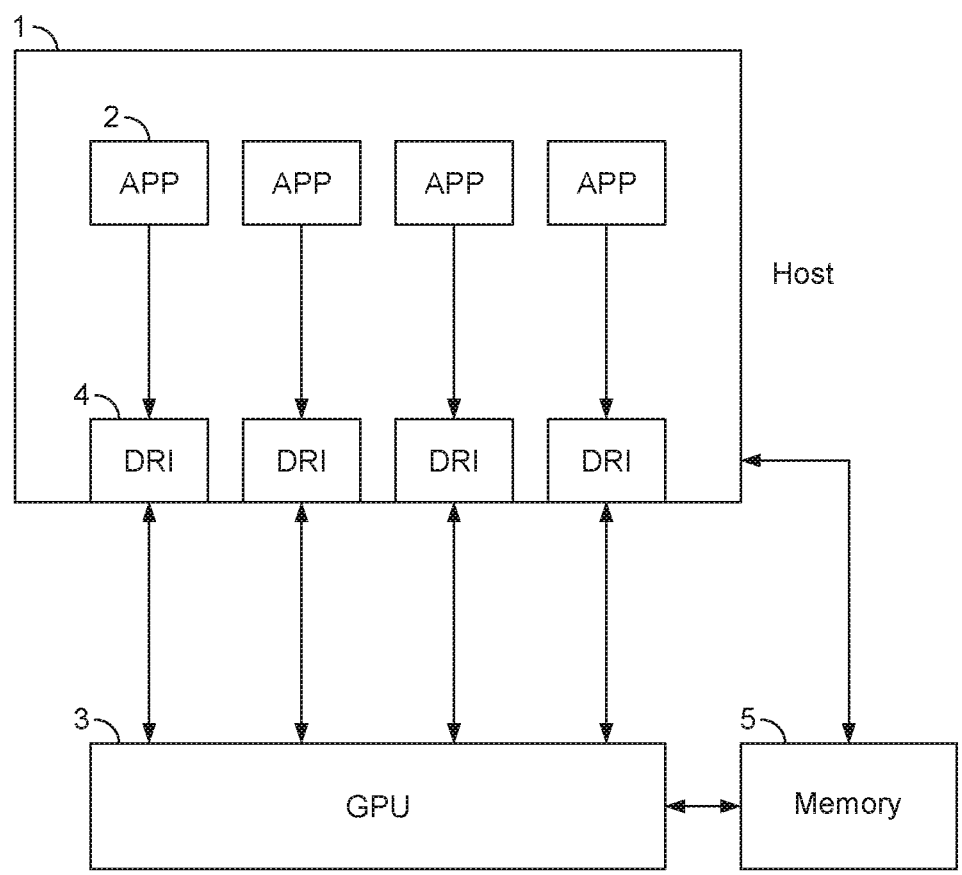
FIG. 1 shows an exemplary computer graphics processing system.

A first embodiment of the technology described herein provides a method of operating a graphics processor that includes a programmable execution unit operable to execute shader programs, and in which when executing a shader program, the programmable execution unit executes the shader program for respective execution threads corresponding to respective work items of an output being generated, each execution thread having an associated set of registers for storing data for the execution thread, the method comprising:

in response to a command to suspend the processing of an output being generated by the graphics processor:

for a group of one or more execution threads currently executing a shader program for the output being generated:

stopping the issuing of shader program instructions for execution by the group of one or more execution threads;

waiting for any outstanding transactions for the group of one or more execution threads that affect the content of the registers associated with the threads of the group of one or more execution threads to complete; and when any outstanding transactions for the group of one or more execution threads that affect the content of the registers associated with the threads of the group of one or more execution threads have completed:

store to memory:

the content of the registers associated with the threads of the group of one or more execution threads; and a set of state information for the group of one or more execution threads, the set of state information including at least an indication of the last instruction in the shader program that was executed for the threads of the group of one or more execution threads.

A second embodiment of the technology described herein comprises a graphics processor, the graphics processor comprising:

a programmable execution unit operable to execute shader programs, and in which when executing a shader program, the programmable execution unit executes the shader program for respective execution threads corresponding to respective work items of an output being generated; and a plurality of registers for storing data for execution threads executing a shader program each execution thread when executing a shader program having an associated set of registers of the plurality of registers for storing data for the execution thread, the graphics processor further comprising a processing circuit configured to, in response to a command to suspend the processing of an output being generated by the graphics processor:

for a group of one or more execution threads currently executing a shader program for the output being generated:

stop the issuing of shader program instructions for execution by the group of one or more execution threads;

wait for any outstanding transactions that affect the content of the registers associated with the threads of the group of one or more execution threads for the group of one or more execution threads to complete; and when any outstanding transactions for the group of one or more execution threads that affect the content of the registers associated with the threads of the group of one or more execution threads have completed:

store to memory:

the content of the registers associated with the threads of the group of one or more execution threads; and a set of state information for the group of one or more execution threads, the set of state information including at least an indication of the last instruction in the shader program that was executed for the threads of the group of one or more execution threads.

The technology described herein relates to the suspending of execution threads that are currently executing a shader program for an output when a command to suspend processing for that output is received by a graphics processor (which "suspend" command may arise because, e.g., as discussed above, the graphics processor is required to switch to processing a different output, e.g. for a different application that is sharing the graphics processor on a time-divided basis).

In the technology described herein, when a suspend command is received, the issuing of instructions for execution by a group of one or more execution threads that are currently executing a shader program is stopped.

However, rather than simply at that point immediately, e.g., storing out any required data, state, etc. needed to allow the execution of a shader program to be resumed for the group of threads at a later date, the graphics processor first waits for any outstanding transactions for the group of one or more threads that affect the content of the registers associated with the threads of the group of one or more execution threads to complete (for example until all outstanding, currently pending, and uncompleted, memory loads and stores as between the registers for the group of one or more threads and the memory system are completed).

Then, once all the register-affecting transactions have completed, the content of the registers for the group of one or more threads, together with an appropriate set of state information, including at least an indication of the last instruction in the shader program that was executed for the threads of the group of one or more threads, is stored to memory.

Stopping issuing instructions and waiting for outstanding register-affecting transactions to be completed effectively ensures that all the data and state for the group of execution threads is located in the registers (the register file) for the group of execution threads and in the thread group state. This then reduces and simplifies the data that needs to be stored to memory for being able to resume execution as compared, for example, to having to store state and data from execution core slave units, such as a load/store unit, texture unit, etc.

It also provides a simpler mechanism for storing the required data to memory, since it is simply the content of the registers that needs to be stored to memory (and the graphics processor will already include and support an appropriate mechanism and circuits, data paths, etc., for doing that).

This also correspondingly reduces the amount of data that needs to be retrieved from memory when resuming execution of the shader program for the group of one or more threads, and correspondingly any need to provide additional data paths for reloading the necessary data.

Furthermore storing out the current register content and a set of state information for the group of one or more execution threads, allows execution of the shader program to be resumed at the next instruction to be executed in the shader program. This correspondingly allows execution of the shader program to be suspended after and at any desired instruction in the shader program.

Thus the technology described herein provides an efficient mechanism for suspending (and subsequently resuming) shader program execution for a thread group, during execution of the shader program and at an (and any) instruction in the shader program (rather than, e.g., having to execute the shader program to completion before suspending the processing).

Suspending the shader program execution at an (arbitrary) instruction boundary facilitates more rapidly completing the suspend operation (thereby reducing the suspend "latency" (e.g., compared to arrangements in which any currently running execution threads execute their shader program to completion before being suspended)), and because the operation can be and is suspended at an instruction boundary, that reduces the potential peak suspend latency, and can also provide an upper bound on the suspend latency, since currently running threads can be and will be suspended (thereby, e.g., allowing threads which are running an infinite loop still to be suspended).

The shader program that is being executed in the technology described herein can be any suitable and desired shader program that can be executed by a graphics processor, such as a geometry shader program, a vertex shader program, a fragment shader program, a compute shader program, or any other form of shader program that is supported by a graphics API.

The shader program will comprise a sequence of instructions to be executed. The set (sequence) of instructions being executed for the program can be any desired and suitable instructions. The program instructions may comprise, for example, one or more or all of: arithmetic (mathematical) operations (add, subtract, multiply, divide, etc.), bit manipulations (invert, swap, shift, etc.); logic operations (AND, OR, NAND, NOR, NOT, XOR, etc.); load-type instructions (such as varying, texturing or load instructions in the case of graphics processing); and store type instructions (such as blend or store instructions).

The operation in the manner of the technology described herein may be, and is in an embodiment, performed irrespective of the, and for each and every, program that the graphics processor is currently executing when the "suspend" command is received.

The group of one or more execution threads for which execution of the shader program is suspended can be any suitable and desired group of one or more execution threads. The technology described herein can be applied in the case of, and to, individual threads (in which case the group of one or more execution threads will comprise a single execution thread) (and in one embodiment that is the case).

In an embodiment, the group of one or more execution threads comprises plural (two or more) execution threads, such as four, eight or sixteen (or more, such as 32, 64 or 128) execution threads.

In an embodiment, the graphics processor and the programmable execution unit is operable to execute shader programs for groups ("warps") of plural execution threads together, in lockstep, one instruction at a time, and the group of one or more execution threads for which execution of the shader program is suspended comprises such a thread group (warp).

Thus, in an embodiment, the group of one or more execution threads comprises plural execution threads, and corresponds to a thread group (warp) that is executing the shader program in lockstep.

(Shader program execution efficiency may be improved by grouping execution threads (where each thread corresponds to one work item) into "groups" or "bundles" of threads, where the threads of one group are run in lockstep, e.g. one instruction at a time. In this way, it is possible to share instruction fetch and scheduling resources between all the threads in the group. Other terms used for such thread groups include "warps" and "wave fronts". For convenience, the term "thread group" will be used herein, but this is intended to encompass all equivalent terms and arrangements, unless otherwise indicated.)

The graphics processor can be any suitable and desired graphics processor that includes a programmable execution unit that can execute program instructions.

The programmable execution unit of the graphics processor can be any suitable and desired programmable execution unit that is operable to execute shader programs.

The graphics processor may comprise a single programmable execution unit, or may have plural execution units. Where there are a plural execution units, each execution unit can, and in an embodiment does, operate in the manner of the technology described herein.

Where there are plural execution units, each execution unit may be provided as a separate circuit to other execution units of the data processor, or the execution units may share some or all of their circuits (circuit elements).

The (and each) execution unit should, and in an embodiment does, comprise appropriate circuits (processing circuits/logic) for performing the operations required of the execution unit.

Thus, the (and each) execution unit will, for example, and in an embodiment does, comprise a set of at least one functional unit (circuit) operable to perform data processing operations for an instruction being executed by an execution thread. An execution unit may comprise only a single functional unit, or could comprise plural functional units, depending on the operations the execution unit is to perform.

The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processor), store type units (such as blend or store units), etc.

In the case where execution threads can be grouped into thread groups (warps) in the manner discussed above, the functional units, etc., of a given programmable execution unit are in an embodiment configured and operable so as to facilitate such thread group arrangements. Thus, for example, the functional units are in an embodiment arranged as respective execution lanes, one for each thread that a thread group (warp) may contain (such that, for example, for a system in which execution threads are grouped into groups (warps) of eight threads, the functional units may be operable as eight respective (and identical) execution lanes), so that the programmable execution unit can execute the same instruction in parallel for each thread of a thread group (warp).

The graphics processor in an embodiment also comprises any other appropriate and desired units and circuits required for the operation of the programmable execution unit(s), such as appropriate control circuits (control logic) for controlling the execution unit(s) to cause and to perform the desired and appropriate processing operations.

Thus the graphics processor in an embodiment also comprises an appropriate thread group execution controller (scheduler) circuit, which is operable to issue thread groups to the programmable execution unit for execution and to control the scheduling of thread groups on/to the programmable execution unit for execution.

In an embodiment, the graphics processor comprises one or more of, and in an embodiment all of: an instruction decode circuit or circuits operable to decode instructions to be executed; an instruction issue circuit or circuits operable to issue instructions to be executed to the programmable execution unit so as to cause the execution unit to execute the required instructions for a thread group; an instruction fetch circuit or circuits operable to fetch instructions to be executed (prior to the decode circuit(s)); an instruction cache for storing instructions locally to the programmable execution unit for execution by execution threads being executed by the programmable execution unit; an execution thread generator (spawner) circuit that generates (spawns) (groups of) threads for execution; and an execution thread scheduler circuit that schedules (groups of) threads for execution (this may be part of the thread generator).

As well as the programmable execution unit, the graphics processor includes a group of plural registers (a register file) operable to and to be used to store data for execution threads that are executing. Each thread of a group of one or more execution threads that are executing a shader program will have an associated set of registers to be used for storing data for the execution thread (either input data to be processed for the execution thread or output data generated by the execution thread) allocated to it from the overall group of registers (register file) that is available to the programmable execution unit (and to execution threads that the programmable execution unit is executing).

Where there are plural execution units, each execution unit may have its own distinct group of registers (register file), or there may be a single group of registers (register file) shared between plural (e.g. some or all) of the separate execution units.

The group(s) of registers (register file(s)) can take any suitable and desired form and be arranged in any suitable and desired manner, e.g., as comprising single or plural banks, etc.

The graphics processor will correspondingly comprise appropriate load/store units and communication paths for transferring data between the registers/register file and a memory system of or accessible to the graphics processor (e.g., and in an embodiment, via an appropriate cache hierarchy).

Thus the graphics processor in an embodiment has an appropriate interface to, and communication with memory (a memory system) of or accessible to the graphics processor.

The memory and memory system is in an embodiment a main memory of or available to the graphics processor, such as a memory that is dedicated to the graphics processor, or a main memory of a data processing system that the graphics processor is part of. In an embodiment, the memory system includes an appropriate cache hierarchy intermediate the main memory of the memory system and the programmable execution unit(s) of the graphics processor.

The technology described herein relates to the operation of the graphics processor when a command to suspend processing for an output that the graphics processor is currently generating is received. As discussed above, such a requirement to suspend processing of a current output can arise, e.g., in the case where the graphics processor is being shared between multiple different applications that require graphics processing, e.g. on a time division basis. In this case, the time "slice" for generating an output for a first application may expire before the output is completed, such that the graphics processor will need to suspend processing of that output and switch to processing a different output, but then be able to resume processing of the first output when the next time "slice" for that output occurs.

The overall suspend operation itself can be instigated in any suitable and desired manner and by any suitable and desired component of the overall data processing system that the graphics processor is part of. In an embodiment, the suspend operation will be triggered by some overall controller (control process) that is controlling the sharing of the graphics processor between the different applications, etc. Thus, in the case of a virtualised hardware arrangement, the suspend operation is in an embodiment initiated by the appropriate overall controller for the virtualised hardware, such as a hypervisor.

In an embodiment, the suspend command that is sent to the graphics processor is sent by an appropriate driver of (for) the graphics processor, e.g. that is executing on a host processor of the overall data processing system that the graphics processor is part of. In this case therefore, the driver will, e.g., receive a suspend command from an overall controller, e.g. hypervisor, of the data processing system, with the driver then in response issuing a corresponding suspend command to the graphics processor.

In the case of a virtualised hardware environment, where there may be multiple drivers controlling their respective operations on the graphics processor, the initial suspend command is in an embodiment sent to the driver whose particular graphics processing operation is to be suspended, with that driver then correspondingly signalling the graphics processor to suspend the processing for that driver.

In an embodiment, the suspending of the processing for the output being generated is performed by and under the control of the driver for the output that is being suspended, so that the driver is permitted to retain control of the graphics processor until the suspend operation has been completed (in contrast, e.g. to the driver being forced to relinquish control of the graphics processor (and the graphics processor being forcibly switched to start processing a different output) when the suspend command is received).

This will help to avoid the graphics processor being switched to generating a different output before the suspend operation in the manner of the technology described herein has been completed (and will correspondingly facilitate the waiting for any outstanding register affecting transactions for the group(s) of one or more execution threads to complete, and the necessary register content and state data to being stored to memory, without being interrupted/preempted (such as could be the case where the control of the suspend operation is not with the driver in question)).

In such arrangements, a "backstop", default "timeout" operation, such that the graphics processor will simply be forced to switch to generating a different output if the suspend operation has not been completed within a particular, in an embodiment selected, in an embodiment predetermined time period (e.g. number of cycles), may still be implemented if desired, so as to allow the output switching in any event, even if the suspend operation for some reason fails to complete successfully. (In this case, the output generation that was forcibly suspended can then be handled in an appropriate manner on resumption of processing for that output, for example by simply assuming that the generation of the output failed and restarting the generation of the output from the beginning. Other "error case" handling arrangements could, of course, be used if desired.)

Correspondingly, when a suspend operation is initiated, the graphics processor is in an embodiment configured to, and allowed to, "clean up" its state, service any page faults, and/or perform cache maintenance operations for the output processing that is being suspended, before switching to start processing a different output (yielding control of the graphics processor). Again, this then facilitates "cleaner" switching of the graphics processor between generating different outputs at arbitrary instruction boundaries, whilst facilitating more efficient and "cleaner" resumption of the processing of an output at a later time.

Thus, in an embodiment, where the technology described herein is being used in a virtualised system, the technology described herein is used in a virtualised system that operates according to "collaborative virtualisation" principles.

When the graphics processor receives the suspend command, e.g. from the driver, it then operates to suspend the execution of a shader program by a group of one or more execution threads that are currently in the process of executing a shader program for the output whose processing is to be suspended.

In an embodiment, all the thread groups that are currently executing a shader program for the output whose processing is to be suspended are suspended in the manner of the technology described herein. Thus, in an embodiment, when the graphics processor receives the suspend command, e.g. from the driver, it then operates to suspend the execution of a shader program for a plurality of groups of one or more execution threads that are currently in the process of executing a shader program for the output whose processing is to be suspended.

Thus the suspend operation is in an embodiment performed for plural (and in an embodiment for all the) groups of execution threads that are currently executing a shader program for the output that is to be suspended, e.g. that have each reached a different stage in the shader program execution (e.g. in the case where there is an execution pipeline which can support plural groups of execution threads executing the same shader program at the same time), and/or that are executing a or the shader program on different execution cores of the graphics processor.

The suspend process accordingly in an embodiment comprises also (and first) identifying those thread groups to which the suspend command applies, and then operating to, as necessary, suspend the execution of a shader program for those identified thread groups. For example, where the graphics processor is capable of having multiple workloads (outputs) running concurrently, such as, for example, a fragment workload (a fragment shading output) running concurrently with a compute workload (a compute shading output) from two different applications, it may be that only one of the workloads (outputs) is to be suspended, and so the graphics processor will need to identify which workload (output) (and thus those thread groups) to which the suspend command applies.

The suspending of the thread group or groups can be performed by any suitable and desired element and circuit of the graphics processor. It is in an embodiment performed by an appropriate thread group execution controller (scheduler) (circuit) that, e.g., is operable to issue thread groups for execution, and that can, correspondingly, control and stop the execution of shader programs by thread groups.

Thus, in an embodiment, the suspend command is provided to a thread group execution controller (scheduler), which controller then, if necessary, identifies the thread groups that are currently executing in the programmable execution unit to which the suspend command applies, and for all such identified (affected) thread groups, triggers the suspend operation in the manner of the technology described herein.

Where the graphics processor includes a control/command "hierarchy" that, e.g., and in an embodiment, is operable to control and issue respective units of processing (work) to units of the graphics processor, then in an embodiment, the suspend command that is received by the graphics processor is appropriately propagated through the command and control hierarchy of the graphics processor to the individual thread group control level (e.g. to the thread group execution controller (scheduler)).

For example, the graphics processor may include a higher level job manager/task manager unit (circuit) that is operable to receive tasks/jobs to be performed by the graphics processor, e.g. via an appropriate command stream that is provided to the graphics processor by the driver for the graphics processor. The task/job manager may then, e.g., schedule and distribute the processing of respective tasks/jobs to the graphics processor (and appropriate functional units of the graphics processor). Correspondingly, there may then be some further controller/scheduler that, e.g., breaks respective tasks/jobs into one or more sub-tasks/jobs to be performed. For example, in the case of a compute shading operation, an overall compute shading task may be subdivided into respective compute shading "work groups", which work groups are then respectively processed by the graphics processor. In this case, e.g., each respective sub-task (e.g. work group) may then be processed as an appropriate set of plural thread groups (e.g. warps).

Thus, where a suspend command is received by the graphics processor, that suspend command is in an embodiment appropriately applied at any and all levels in the processing (subdivision) hierarchy of the graphics processor, thus at the task and sub-task (e.g. work group) level, as well as at the individual thread group level.

Once the suspend command reaches the "thread group" controller (e.g. the thread group execution controller) (scheduler), then the suspend operation in the manner of the technology described herein is performed.

Thus the appropriate controller stops the issuing of any further instructions for execution for a (and each) thread group that the suspend operation applies to.

Any to be suspended thread group should, and in an embodiment does, accordingly execute any instruction or instructions that have been already been issued for execution by the thread group, but no further instructions will be issued for execution by the to be suspended thread group.

Thus, in an embodiment, a thread group being suspended will complete the execution of its current instruction, but will not execute another instruction thereafter.

As well as stopping the issue of instructions for execution by the thread group, a to be suspended thread group also waits for any (and all) outstanding transactions for the thread group that affect the content of the registers associated with the threads of the group of one or more execution threads to complete. Such transactions may, and in an embodiment do, comprise any pending (uncompleted) transactions that will affect the state and content of the registers (the register file) for the thread(s) of the thread group in question. As discussed above, this is so as to ensure that the content of the sets of registers (the register file) for the thread group in question is complete for the stage of the program execution that the thread group has reached.

In an embodiment, such transactions comprise at least memory transactions that relate to the transferring of data between the registers and memory, such as at least (memory) load and store transactions. Thus, in an embodiment, the operation in the manner of the technology described herein comprises (and the processing circuit is correspondingly configured to) waiting for any outstanding memory transactions for the group of one or more execution threads to complete, before storing the register content and state information to memory.

In an embodiment, the register-affecting transactions also or instead, and in an embodiment also include transactions (operations) being performed by "slave units" (e.g., in an embodiment fixed function, hardware accelerators) of the graphics processor (and which can be used by the programmable execution unit to perform particular processing operations when executing a shader program), such as, for example, a texture unit, a varying unit or a blending unit of the graphics processor, the results of which slave unit operation will be returned to the register(s) of the thread group.

In such a case, the programmable execution unit may, for example, issue a request to such slave units to perform processing operations, with the result of the slave unit's processing then being written to the appropriate registers for the threads of the thread group in question. In such operation, it may be the case that the slave unit, such as the texture unit, will issue a memory request to fetch the (e.g. texture) data that it needs, and then use that fetched data (e.g. to perform a filtering operation), before then returning the result of the slave unit processing to the execution unit (to the registers associated with the threads of the thread group), as appropriate. The technology described herein accordingly (in an embodiment) also waits for any such "slave unit" transactions that will affect the content of the registers for the thread groups to complete before storing the register content and state information to memory.

Thus, in an embodiment, the operation in the manner of the technology described herein comprises (and the processing circuit is correspondingly configured to) waiting for any outstanding slave unit transactions (operations) for which the results will be written to the registers of the group of one or more execution threads for the group of one or more execution threads to complete, before storing the register content and the state information to memory.

The waiting for any outstanding register affecting transactions to complete and the determining of when any outstanding register affecting transactions have been completed can be monitored and tracked in any suitable and desired manner. In an embodiment, this is done by maintaining appropriate dependency counters (slots) that track outstanding register affecting transactions and that can be used to determine when any outstanding register affecting transactions have been completed. Thus, in an embodiment, the system is operable to track, e.g. by means of appropriate counters, any register affecting transaction dependencies for a (and the) threads of a thread group that is executing a shader program, and that register affecting transaction dependency tracking is then used to determine whether there are any outstanding register affecting transactions to complete (and the completion of those transactions).

The Applicants have further recognised in this regard that as well as there potentially being outstanding register affecting transaction dependencies when a thread group's shader program execution falls to be suspended, there can be other forms of outstanding (unmet) dependencies for the thread group and the program execution as well. An example of this would be so-called "barrier" dependencies, where continued execution of a shader program by a thread group is dependent upon, e.g., another thread group first reaching a particular point in its shader program execution. Again, such "barrier" dependencies can be tracked by using appropriate dependency counters (slots) to count any outstanding dependencies and indicate when those dependencies have been met.

However, the Applicants have recognised that for the operation in the manner of the technology described herein, it is not necessary to wait for any other dependencies, such as barrier dependencies, to be met before suspending and writing out the necessary data and state for a suspended thread group (and, indeed, that that may in fact be undesirable when seeking to suspend thread groups with reduced latency and at an arbitrary instruction boundary).

Thus, in an embodiment, the operation in the manner of the technology described herein, while waiting for any outstanding register affecting transactions for a thread group to complete, does not wait for any other outstanding transactions to complete (for any other outstanding dependencies to be met). Thus if there is, for example, an unmet barrier dependency, the process does not wait until that dependency is met, but rather suspends the thread group (and writes out its register content and state) with the dependency in its unmet state.

Correspondingly, where appropriate dependency counters (slots) are being used to track both register affecting transactions and other, e.g., barrier, dependencies, the process of the technology described herein will wait for some but not all of the dependency counters (slots) to be met (cleared) (i.e. for those counters (slots) relating to register affecting transactions to be cleared).

As will be discussed further below, in order to allow for this operation, in an embodiment, the set of state information for a thread group that is stored to memory when a thread group has been suspended in the manner of the technology described herein also comprises an indication of any dependencies, such as, and in an embodiment, any barrier dependencies, that have not been met (and, e.g., and in an embodiment, the appropriate barrier dependency count at the time that the thread group was suspended).

Once all the outstanding register affecting transactions for the group of execution threads have completed (and the group of execution threads has completed executing its current issued instruction(s)), then the content of the set of registers associated with each thread of the thread group is stored to memory.

The content of the sets of registers (register file) for the thread(s) of the group of one or more execution threads can be stored to any suitable and desired memory and in any suitable and desired manner. It should be and is in an embodiment stored in a way that facilitates restoring the data to appropriate sets of registers (the register file) for the threads of the thread group when processing of the thread group is to resume. Each thread in a thread group should, and in an embodiment does, store its register(s).

Thus, in an embodiment, the content of the sets of registers for the thread(s) of the thread group are stored in a particular, in an embodiment selected, in an embodiment predetermined, thread order, for example, in an embodiment in the thread index order for the thread group. Correspondingly, where each thread has plural registers, the register content for the threads is in an embodiment stored in a given, in an embodiment selected, in an embodiment predetermined register order (and in an embodiment in increasing register number order). The register content is in an embodiment stored in the desired (register and thread) order at progressively increasing addresses, e.g., and in an embodiment, in a "suspend" buffer allocated in the memory for that purpose.

As well as storing the register content to memory once all the outstanding register affecting transactions for the group of execution threads have completed, a set of state information for the thread group is also stored to memory.

In an embodiment, a respective set of state information is stored for each thread in the thread group. Thus the state information for the thread group will include a set of state information for each thread in the thread group. The Applicants have recognised in this regard that although some of the state could be invariant (the same) across the thread group as a whole, that need not necessarily be the case (for example, a divergent flow control could mean that each thread could be at a different instruction (program count), such that it is preferable to store a set of state information for each thread (to store the state per thread).

This said, while in one embodiment a "full", separate set of state information is stored for each thread in the thread group as part of the set of state information for the thread group as a whole, in the case where it is known that state information will be invariant (the same) for all threads of the thread group, such invariant state could, for example, be stored only once for the thread group as a whole, thereby allowing the set of state information for the thread group as a whole to be stored in a more compact fashion, if desired.

The state information for each thread in the thread group is in an embodiment stored in a particular, in an embodiment selected, in an embodiment predefined, thread order, such as, for example, and in an embodiment, in the thread order (the thread index order) within the thread group.

The set of state information for a thread includes at least an indication of the last instruction in the shader program that was executed for the thread. This may, for example, and in an embodiment, be in the form of a program count (PC) value (e.g. the current PC value at the time the thread group was suspended) for the thread (which, e.g., either indicates the last executed instruction or the next instruction to be executed).

The set of state information should, and in an embodiment does, also include any other state information that may be required for resuming execution of the shader program by the thread (i.e. any state needed to subsequently resume the thread execution).

Thus, in an embodiment, it includes information indicating (a record of) any outstanding (unmet) dependencies, such as barrier dependencies, for the thread at the point when the shader program execution by the thread group was suspended.

In the case where the thread group can contain plural threads, some or all of which may be "active", the state information in an embodiment also comprises an indication of whether the thread was active (or not). It may also comprise any one or more or all of: a call stack depth for the thread (i.e. where in the function call stack the thread was at the time its execution was suspended); the state of any "discard" flag for the thread; the state of any "terminate" flag for the thread; etc.

The set of state information for the thread group can correspondingly be stored in any suitable and desired memory and in any suitable and desired manner. It is in an embodiment stored in association with the register content for the thread group in question (and in an embodiment together with the register content in the memory, e.g. in the same buffer, and in an embodiment contiguously with the register content, e.g. (immediately) after the register content).

The storing of the register content and the thread group state information can be triggered and performed in any suitable and desired manner. In an embodiment, this is done by executing an appropriate "suspend" routine which stores the register content and the relevant state information for the thread group in memory. This is in an embodiment executed as an appropriate sequence of instructions (e.g. a microcoded sequence) that store the register content and the thread group state information in memory, e.g., and in an embodiment, at progressively increasing addresses in a "suspend" buffer allocated in memory for that purpose.

Thus, the suspend routine in an embodiment comprises a sequence of one or more register content store instructions, e.g. and in an embodiment, that store the register content in a given register order (and in an embodiment in increasing register number order), together with a state information store instruction (in an embodiment after the register store instruction(s)).

The suspend routine is in an embodiment not executed by the programmable execution unit whose processing is being suspended itself, but is in an embodiment executed in another execution unit (pipeline) of the programmable processing core, such as, and in an embodiment, a "message unit (block)" of the processing core (e.g. that is operable to send messages to slave units of the graphics processor).

The Applicants have recognised in this regard that where the graphic processor includes plural different execution units (pipelines), such as message unit (block), a fused multiply add unit (pipeline), a special functions units (pipeline), etc., in addition to the main data path programmable execution unit (that is the main data processing path for the graphics processor when executing a shader program), it would be preferable to execute the suspend routine on an execution unit (pipeline) that is not the main data path programmable execution unit, as in that case, executing the suspend routine should not, for example, then interfere with other processing that is happening concurrently in other pipelines (such as in the main data path programmable execution unit). For example, if there was a fragment task executing concurrently with a compute work group that is to be suspended, the execution of the fragment processing would be allowed to continue in the main data path while the compute workload processing is suspended (and there should not be any blocking to the other pipelines).

Thus, in an embodiment, the graphics processor includes both the programmable execution unit that is currently executing the shader program for the group of one or more execution threads whose processing is to be suspended, and a further (separate) execution unit, and the suspend operation is triggered by executing a suspend routine in the further, separate execution unit.

In an embodiment, the completion of the storing of the register content and the state information to memory (the completion of the suspend "routine") is tracked, so it can be determined when the suspend operation (routine) for a thread (and thread group) has been completed. Again, this is in an embodiment done by means of an appropriate dependency counter that tracks the completion of each store instruction (operation). Thus, for example, and in an embodiment, each operation to write data, e.g. register content or state information, to memory may set a dependency that is then cleared when that write operation has been completed.

It should be noted here that all the stores, both of register content and state information, can, and are in an embodiment allowed to, proceed and be done concurrently, but it is only after all the tracking dependencies have cleared that the thread in question is retired.

Once the suspend operation for a thread group has been completed, then the thread group is suspended (and can, as will be discussed further below, be resumed at a future time).

In an embodiment, once the suspend operation for a thread group has been completed, the thread group also returns a suspend status response, e.g. to the thread group issuing/scheduling controller, e.g., and in an embodiment, to indicate whether the thread group has been (successfully) suspended partway through its execution of the shader program or not (and in an embodiment returns an error indication in the case where the suspend operation failed for any reason).

The above primarily describes the operation when suspending a single thread group. However, the Applicants have recognised that typically when a suspend command is received, there will be a plurality of thread groups "in flight" for the output in question. In that case, the suspend operation described above is in an embodiment performed for each thread group that is currently partway through executing a shader program for the output in question. In this case therefore, the register content and state information for a plurality of thread groups will be written out to memory.

In an embodiment, this is done so as to allow the register content and state information for each respective thread group (and the thread group to which the register content and state information relates) to be identified, so that that data can be appropriately restored when resuming processing of the output.

Such identification can be achieved as desired, for example by storing each respective set of register content and state information in association with appropriate identification information to allow thread group to which the register data and state information applies to be identified.

However, in an embodiment, the register content and state information for a group of plural thread groups that is being written out, e.g., and in an embodiment, to a "suspend" buffer for the group of thread groups in question, is written out to memory and stored, e.g. in the suspend buffer, e.g., and in an embodiment, at progressively increasing addresses, in a particular, in an embodiment selected, in an embodiment predetermined, thread group order. This can then avoid, for example, the need to store additional information with the register content and state information, e.g., to explicitly indicate which thread group a particular set of data corresponds to. (Since on the resume operation, the graphics processor can then work through the stored register content, etc., in a particular, known, order, so that it can then just read the data for the thread groups from the, e.g., suspend buffer, in the order that it was stored in.)

In an embodiment, the particular order that the register content and state information is stored in, is the order of issue of the thread groups within the set of plural thread groups in question. The Applicants have recognised in this regard that in many cases, thread groups of a set of plural thread groups (e.g. of a compute shading work group) will be issued in a particular order (although they may then be processed out-of-order), and, typically, the thread groups will be associated with some sort of identifier or age indicator that allows the order of the thread group in the initial order to be determined. If the thread group register content and state information is stored in that same issue order, then when resuming the processing for the set of plural thread groups, the thread groups of the set can simply be issued in their original issue order, and the corresponding thread group register content and state information can be read from the sequence of stored register content and state information.

Such ordering of the writing out of the register content and state information for thread groups to the, e.g. suspend buffer, can be provided and facilitated in any suitable and desired manner. For example, and in an embodiment, it may be enforced using existing register affecting transaction dependencies where such dependencies already exist and are suitable for that purpose.

Other arrangements would, of course, be possible.

As well as storing register content and state information for each thread group, each thread group in an embodiment also correspondingly returns an appropriate suspend status indication (as discussed above). Again, this is in an embodiment done in a particular, in an embodiment selected, in an embodiment predetermined order, and in an embodiment in the thread group issue order, so that the thread groups to which the status indications relate can be determined.

The Applicants have further recognised in this regard that in many graphics processing arrangements, a plurality of thread groups (warps) will be organised and processed (e.g. issued) on the basis of a larger collection (grouping) of plural thread groups together. For example, in the case of a compute shading operation (compute shader execution), a given work group of compute shader work items may be processed as a set of plural thread groups all belonging to the work group in question. Similarly, in the case of rendering graphics processing, e.g. to render a frame for display, a set of plural fragments (belonging to the same primitive), such as a 2×2 fragment "quad", may be processed as a set of plural thread groups for (belonging to) that "quad" (or other fragment grouping).

Furthermore, where there is a set of plural related thread groups (e.g. for a given work group) executing a shader program, it could be the case that, when the "suspend" command is received, some of the thread groups in the set will have completed their execution of the shader program, some will be part way through their execution of the shader program, and some will not have started execution of the shader program. Thus, where there are plural associated (related) thread groups, e.g. belonging to a larger defined set of plural thread groups (such as a work group for a compute shading operation), the Applicants have recognised that while some thread groups of the set of (associated) plural thread groups may, and typically will, be suspended in the manner of the technology described herein as discussed above, other thread groups of the set of plural thread groups may have completed their shader program execution, and other thread groups of the set of plural thread groups may have yet to start their shader program execution.

Thus, in an embodiment, the graphics processor also operates to record (and store for future use), the status of thread groups of a set of plural thread groups when a suspend command is received and the suspend operation is performed. This is in an embodiment done for plural and in an embodiment for each, respective set of plural thread groups (e.g. work group) that was "in flight" at the time the suspend command was received.

In an embodiment, a given thread group of a set of plural thread groups can be indicated as having one of three states: thread group "not started" (i.e. shader program execution for the thread group has not yet begun); thread group "suspended" (i.e. the thread group was suspended partway through execution of the shader program); and thread group "completed" (i.e. the thread group had completed its execution of the shader program before the suspend command was received). In an embodiment, these three states are indicated using a two-bit value (with the fourth value that can be indicated then (in an embodiment) being used to indicate an error state or some other special case, as desired).

Thus, in an embodiment, as well as storing the register content and a set of state information in memory for each respective thread group whose shader program execution is suspended partway through, the graphics processor also operates to store in memory a suspend state indication for plural, and in an embodiment for each, thread group of a set of plural, and in an embodiment related, thread groups, such as, and in an embodiment, for all the thread groups of a given work group in a compute shading operation (that is being suspended).

Thus, in an embodiment, a respective set of suspend state indications is stored for a given set of plural thread groups that is being suspended, such as for a respective work group in a compute shading operation, indicating, for each thread group in the set, whether the thread group had not yet started its execution of the shader program, was suspended partway through execution of the shader program, or had completed its execution of the shader the program. The suspend state indications are in an embodiment stored together, e.g., and in an embodiment, in an appropriate "suspend state" buffer, e.g., and in an embodiment, at progressively increasing addresses in memory.

The thread group suspend status indications for the thread groups of a given set of plural (associated) thread groups could be stored in association with identifiers indicating to which thread group the respective suspend status indication applies to, but in an embodiment, the thread group suspend status for the thread groups of a given set of plural (associated) thread groups is again stored in a particular, in an embodiment selected, in an embodiment predetermined, thread group order, so as to avoid, for example, the need to store additional information with the "suspend state" indications, e.g. to explicitly indicate which thread group a particular suspend state indication corresponds to.

In an embodiment, the particular order that the suspend state indications are stored in, is the order of issue of the thread groups within the set of plural of thread groups (as discussed above).

Correspondingly, where there are plural thread groups within a set of plural (associated) thread groups that are in flight when the suspend command is received, the thread groups are in an embodiment checked for suspending (and suspended if necessary), and return their suspend status indications, in the thread group issue order, as that should then help to ensure that the suspend status indications for the thread groups of the set (e.g. work group) will be returned in the desired particular, e.g. and in an embodiment issue, order, and accordingly can be stored at progressively increasing addresses in the desired particular, e.g. and in an embodiment issue, order.

In an embodiment, in the case where the graphics processor supports and/or is using larger groupings of processing, such as tasks that may comprise, e.g., plural work groups, etc., then corresponding "suspend status" indications are in an embodiment determined and stored for any such larger groupings of processing (as appropriate), e.g., and in an embodiment based on the suspend status of the respective smaller groupings of processing that they contain.

For example, an overall suspend status is in an embodiment also indicated and stored for a given set of (associated) plural thread groups, such as for compute shading work group, based on the suspend status of the thread groups within that set of plural thread groups (e.g., and in an embodiment, such that if all of the thread groups for the set of thread groups have been completed, then the set of thread groups is also indicated as and set to "completed", if all the thread groups for the set of thread groups have yet to begin their execution of the shader program, then the set of thread groups will be set to and indicated as being "not yet started", and if any of the thread groups within the set of thread groups had their processing suspended in the manner of the technology described herein, then the suspend status of the set of thread groups will be set to and indicated as being "suspended").

Again, these suspend status indications are in an embodiment provided and stored in a particular, in an embodiment selected, in an embodiment predetermined order, and in an embodiment the processing order of the "tasks" in question, for the reasons discussed above in relation to the status of thread groups within a set of plural thread groups.

Correspondingly, in the case where sets of plural thread groups (e.g. compute shading work groups) are organised themselves into groups, e.g. within larger "tasks" that have been allocated to the graphics processor, then again a set of similar suspend status indications for a respective group of sets of plural thread groups is in an embodiment maintained and provided and stored in a similar manner.

In these arrangements, where suspend status indications are determined and stored for larger groupings of processing (e.g. of sets of plural groups of execution threads), then that is in an embodiment done by and at the appropriate controller (control circuit) for those groupings of processing. For example, there may be a higher level controller that controls the issuing of work groups, for example, which higher level controller could then determine the status of respective work groups, and store out the suspend status records for the work groups within a given set of plural work groups. Correspondingly, there may be higher level controller that, e.g., issues tasks to the graphics processor, which can, and in an embodiment does, correspondingly monitor and determine the suspend status at the task level of subdivision.

Other arrangements would, of course, be possible.

It will be appreciated that in the technology described herein the generation of a first output is in an embodiment suspended in order to allow the graphics processor to start (or resume) generating a second output. Thus, in embodiments, a suspend command is issued to the graphics processor when it is desired to switch from generating a first output to generating a second, different output.

Thus, in embodiments, the graphics processor is operated to generate a first output; and in response to receiving a command to suspend generation of the first output, the generation of the first output is suspended in the manner described above; and then once the generation of the first output has been suspended, the graphics processor is operated to generate a second output. At a later point, the generation of the second output may itself be suspended, and so on.

In one embodiment, once the second output is suspended, the graphics processor then resumes processing of the first output. However, there may be more than two different outputs being generated in a time-shared manner, and so the graphics processor may, e.g., suspend generating the second output and start generating a third (or further) output before resuming the first output, and so on.

The above describes the operation when graphics processing that is generating a given output is to be suspended. It will be appreciated from the above, that when graphics processing is suspended in the manner of the technology described herein, there will be a need to, and the intention is that, the graphics processing is resumed at a later time. The technology described herein also extends to the corresponding operation of resuming graphics processing that has previously been suspended in the manner of the technology described herein.

The resume operation should be, and is in an embodiment, the reverse (the inverse) of the suspend operation (and flow).

Thus, the graphics processor will receive a resume command, which, inter alia, indicates which graphics processing operation (output generation) (graphics processing context) is to be resumed.

The graphics processor in an embodiment then identifies the thread groups for which shader program execution was suspended partway through when the processing of the output that is to be resumed was suspended, so as to identify those thread groups for which the shader program execution needs to be resumed and completed.

This is in an embodiment done by the graphics processor identifying and loading the appropriate "suspend status" indications for the output that is being resumed, such as, and in an embodiment, each respective suspend status buffer for the output in question.

The suspend status indications (buffers) will then be used to identify those thread groups for which fragment shader execution needs to be resumed.

This identification using the suspend status indications can be performed in any appropriate and desired manner. For example, and in an embodiment, the graphics processor may first consider suspend status indications (buffers) for larger groups of processing, such as for respective work groups, to identify the larger groups of processing, such as work groups, for which fragment shader program execution was suspended (and thus needs to be resumed). The graphics processor can then use the suspend status indications (buffers) for the thread groups within the respective larger groups of processing (e.g. work groups) to identify the individual thread groups whose fragment shader execution needs to be resumed.

Then, for any thread group whose suspend status was "suspended", the fragment shader execution for that thread group should be, and is in an embodiment, resumed at the appropriate point in the shader program.

This is in an embodiment done by the appropriate thread group controller (generator/scheduler) (re)issuing the thread groups (issuing new, corresponding thread groups) to the programmable execution unit for execution, with the issued thread groups then resuming the execution of the shader program at the appropriate point in the shader program.

Thus, in an embodiment, the appropriate, e.g. higher level, controller of the graphics processor issues an appropriate resume command to the thread group controller (e.g. generator/scheduler), and the thread group controller then issues thread groups for execution of the shader program to the programmable execution unit, e.g. in the appropriate order, to resume shader program execution for the thread groups.

Correspondingly, for any thread group whose suspend status is indicated as "completed", that thread group is in an embodiment not processed again on resumption of the generation of the output in question, and for any thread group whose fragment shader execution suspend status was "not started", that thread group is in an embodiment simply created and issued for execution of the shader program from the beginning, in the normal manner.

Thus, in an embodiment, for any set of plural thread groups whose overall suspend status was "suspended", such as a "suspended" compute shading work group, the graphics processor works through the individual thread groups in the set, checking their respective suspend statuses, and processes the individual thread groups accordingly. The graphics processor in an embodiment works through the thread groups in sequence, and in an embodiment in the particular, in an embodiment selected, in an embodiment predetermined, thread group order, such as, and in an embodiment, in the issue order of the thread groups, as discussed above.

Thus the graphics processor will, in an embodiment, use the stored suspend status indications for the thread groups and any larger groups of processing (such as work groups), to identify those thread groups (warps) for the output whose processing is being resumed whose shader program execution was suspended partway through when the processing of the output in question was suspended, and then resume execution of the shader program for those suspended thread groups at the appropriate point in their shader program execution.

For a thread group whose shader program execution was suspended partway through, then when the thread group is "re-issued", to resume its execution of the shader program, the graphics processor in an embodiment first operates to load the previously stored content of the registers for the thread group to the appropriate sets of registers for the threads of the thread group, together with the appropriate thread group state information, including the indication of which instruction in the shader program is to be executed next (i.e. at which the shader program execution should be resumed).

Once this is done, the programmable execution unit will resume execution of the shader program for the suspended thread group at the appropriate point (e.g., and in an embodiment, by using the indicated instruction as an indirect branch into the shader program), using the restored register content, and resume and continue execution of the shader program for the thread group accordingly (and appropriately), until completion (or the execution is again suspended before the shader program is completed).

Thus, in an embodiment, the method further comprises (and the graphics processor is correspondingly configured to) (at a later time after the graphics processor has suspended generating a given output), the graphics processor receiving a command to resume processing of the suspended output, and, in response to receiving the command to resume processing of the suspended output:

for a thread group whose shader program execution was suspended partway through when processing of the output was suspended:
  issuing a corresponding group of one or more execution threads to the programmable execution unit to execute the shader program;
  loading the register content for the threads of the thread group that was written out when processing of the thread group was suspended to registers associated with threads of the issued thread group;

loading the thread group state information for the thread group including at least the indication of the last instruction in the shader program that was executed for the threads of the thread group;

and, after the register content and thread group state data has been loaded:

resuming execution of the shader program for the issued thread group after the indicated last instruction in the shader program that was executed for the threads of the thread group (and in an embodiment at the next instruction in the shader program after the indicated last instruction in the shader program that was executed for the threads of the thread group); and using the loaded content of the registers for the threads of the thread group when executing the shader program for the issued thread group.

The loading of the register content and the thread group state information can be triggered and performed in any suitable and desired manner. In an embodiment, this is done by executing an appropriate "resume" routine which loads the register content and the relevant state information for the thread group from memory. This is in an embodiment executed as an appropriate sequence of instructions (e.g. a micro-coded sequence), in an embodiment as a prologue to the shader program execution, that loads the register content and the thread group state information from memory, e.g., and in an embodiment, from the allocated "suspend" buffer in memory.

Thus, the resume routine in an embodiment comprises a sequence of one or more register content load instructions, e.g. and in an embodiment, that load the register content in a given register order (and in an embodiment in increasing register number order), together with a state information load instruction (in an embodiment after the register load instruction(s)).

The resume routine is again in an embodiment not executed by the programmable execution unit (that executes the main shader program data path) itself, but is in an embodiment executed in another execution unit (pipeline) of the programmable processing core, such as, and in an embodiment, a "message block" of the processing core.

Thus, in an embodiment, the graphics processor includes both the programmable execution unit that is to execute the shader program for the group of one or more execution threads whose processing is to be resumed, and a further (separate) execution unit, and the resume operation is triggered by executing a resume routine in the further, separate execution unit.

In an embodiment, the completion of the loading of the register content and the state information from memory (the completion of the resume "routine") is tracked, so it can be determined when the resume operation (routine) for a thread group has been completed. Again, this is in an embodiment done by means of an appropriate dependency counter that tracks the completion of each load instruction (operation). Again all the loads of register content and state information, can, and are in an embodiment allowed to, proceed and be done concurrently, but it is only after all the loads have completed that the shader program execution is resumed.

Once the resume operation for a thread group has been completed, then the shader program execution for the thread group can be, and is in an embodiment, resumed (recommenced). The shader program execution for the thread group will be resumed from the appropriate instruction, and can otherwise proceed and be performed in the normal manner for execution of the (remaining part of) shader program, with the execution threads using the loaded data in their registers appropriately as the shader program execution is continued.

It is believed that this resume operation is novel and advantageous in its own right.

Thus, another embodiment of the technology described herein comprises a method of operating a graphics processor that includes a programmable execution unit operable to execute shader programs, and in which when executing a shader program, the programmable execution unit executes the shader program for respective execution threads corresponding to respective work items of an output being generated, each execution thread having an associated set of registers for storing data for the execution thread, the method comprising:

in response to a command to resume the processing of an output being generated by the graphics processor whose processing was previously suspended:

for a group of one or more execution threads whose execution of a shader program for the output whose processing is being resumed was stopped when the processing of the output was suspended:

issuing a corresponding group of one or more execution threads to the programmable execution unit to execute the shader program;

loading from memory into registers associated with threads of the issued thread group a set of register content for the threads of the thread group that was written out to memory when processing of the thread group was suspended;

loading from memory a set of thread group state information for the thread group including at least an indication of the last instruction in the shader program that was executed for the threads of the thread group when processing of the thread group was suspended;

and after the register content and the thread group state data has been loaded:

resuming execution of the shader program for the issued thread group after the indicated last instruction in the shader program that was executed for the threads of the thread group; and using the loaded content of the registers for the threads of the issued thread group when executing the shader program for the issued thread group.

Another embodiment of the technology described herein comprises a graphics processor, the graphics processor comprising:

a programmable execution unit operable to execute shader programs, and in which when executing a shader program, the programmable execution unit executes the shader program for respective execution threads corresponding to respective work items of an output being generated; and a plurality of registers for storing data for execution threads executing a shader program, each execution thread when executing a shader program having an associated set of registers of the plurality of registers for storing data for the execution thread, the graphics processor further comprising a processing circuit configured to, in response to a command to resume the processing of an output being generated by the graphics processor whose processing was previously suspended:

for a group of one or more execution threads whose execution of a shader program for the output whose processing is being resumed was stopped when the processing of the output was suspended:

issue a corresponding group of one or more execution threads to the programmable execution unit to execute the shader program;

load from memory into registers associated with threads of the issued thread group a set of register content for the threads of the thread group that was written out to memory when processing of the thread group was suspended;

load from memory a set of thread group state information for the thread group including at least an indication of the last instruction in the shader program that was executed for the threads of the thread group when processing of the thread group was suspended; and after the register content and the thread group state data has been loaded:

resume execution of the shader program for the issued thread group after the indicated last instruction in the shader program that was executed for the threads of the thread group; and use the loaded content of the registers for the threads of the issued thread group when executing the shader program for the issued thread group.

As will be appreciated by those skilled in the art, these embodiments of the technology described herein can, and in an embodiment do, include any one or more or all of the optional features of the technology described herein, as appropriate.

Thus, for example, and in an embodiment, the method comprises (and the graphics processor comprises a processing circuit configured to), in response to the command to resume processing of an output being generated by the graphics processor whose processing was previously suspended, first identifying any groups of one or more execution threads whose execution of a shader program for the output whose processing is being resumed was stopped when the processing of the output was suspended, and then for each such identified group of one of more execution threads, resuming the execution of the shader program for that group of one or more execution threads in the manner of the technology described herein.

The identification and determination of those groups of one or more execution threads whose execution of the shader program was stopped is correspondingly in an embodiment performed by using a previously stored set of suspend status indications (e.g. a suspend status buffer), and in an embodiment by loading such a buffer from memory and then analysing the buffer accordingly as discussed above.

Correspondingly, in an embodiment, any groups of one or more execution threads that had not yet started execution of the shader program for the output whose processing is being resumed when the processing of the output was suspended are identified, and those groups of one or more execution threads are issued to the programmable execution unit to execute the shader program from the beginning.

Similarly, in an embodiment, any groups of one or more execution threads whose execution of the shader program had been completed are in an embodiment identified (and not "re-processed").

The Applicants have further recognised that there may, for example, be some barrier dependencies at the level of sets of plural thread groups. For example, in the case of a compute shader operation, there may be a "barrier" instruction that each thread in the work group must execute before any thread in the work group can execute any instruction after the barrier. This is used, for example, to synchronise the program execution between threads. In order to implement this operation, a barrier counter may, for example, be maintained per work group which counts the number of threads that have reached the barrier in the work group, such that once the barrier counter is equal to the size of the number of threads in the work group, it will be known that all threads have reached and executed the barrier instruction (such that the barrier dependency for all threads groups which belong to the work group can then be released). In an embodiment, this barrier dependency is also tracked and saved for sets of plural thread groups (e.g. work groups) as appropriate (since it could be the case that when a suspend command is received, some threads and thread groups of a work group will have reached the barrier, but others may not have).

Thus, in an embodiment, where such barrier instruction dependencies exist, the current barrier count for a set of plural thread groups (e.g. work group) is also stored to the suspend buffer. Correspondingly, the state information per thread that is stored in an embodiment also includes an indication of whether the thread in question was currently waiting for the barrier dependency or not.

This state information is in an embodiment correspondingly loaded (restored) when the processing is to be resumed, so as to be able to recreate the barrier count and thread barrier dependency waits when resuming the processing.

The technology described herein also extends to the overall method, etc., for suspending and subsequently resuming the generation of a given output.

Thus, another embodiment of the technology described herein comprises a method of operating a graphics processor that includes a programmable execution unit operable to execute shader programs, and in which when executing a shader program, the programmable execution unit executes the shader program for respective execution threads corresponding to respective work items of an output being generated, each execution thread having an associated set of registers for storing data for the execution thread, the method comprising:

in response to a command to suspend the processing of an output being generated by the graphics processor:

for a group of one or more execution threads currently executing a shader program for the output being generated:

stopping the issuing of shader program instructions for execution by the group of one or more execution threads;

waiting for any outstanding transactions for the group of one or more execution threads that affect the content of the registers associated with the threads of the group of one or more execution threads to complete; and when any outstanding transactions for the group of one or more execution threads that affect the content of the registers associated with the threads of the group of one or more execution threads have completed:

storing to memory:

the content of the registers associated with the threads of the group of one or more execution threads; and a set of state information for the group of one or more execution threads, the set of state information including at least an indication of the last instruction in the shader program that was executed for the threads of the group of one or more execution threads;

the method further comprising:

in response to a command to resume the processing of the output whose processing was suspended:

for the group of one or more execution threads whose execution of the shader program for the output was stopped when the processing of the output was suspended:

issuing a corresponding group of one or more execution threads to the programmable execution unit to execute the shader program;

loading from memory into registers associated with threads of the issued thread group the register content for the threads of the thread group that was written out to memory when processing of the thread group was suspended;

loading from memory the stored set of thread group state information for the thread group including at least an indication of the last instruction in the shader program that was executed for the threads of the thread group when processing of the thread group was suspended; and after the register content and the thread group state data has been loaded:

resuming execution of the shader program for the issued thread group after the indicated last instruction in the shader program that was executed for the threads of the thread group; and using the loaded content of the registers for the threads of the issued thread group when executing the shader program for the issued thread group.

A further embodiment of the technology described herein comprises a graphics processor, the graphics processor comprising:

a programmable execution unit operable to execute shader programs, and in which when executing a shader program, the programmable execution unit executes the shader program for respective execution threads corresponding to respective work items of an output being generated; and a plurality of registers for storing data for execution threads executing a shader program each execution thread when executing a shader program having an associated set of registers of the plurality of registers for storing data for the execution thread, the graphics processor further comprising a processing circuit or circuits configured to:

in response to a command to suspend the processing of an output being generated by the graphics processor:

for a group of one or more execution threads currently executing a shader program for the output being generated:

stop the issuing of shader program instructions for execution by the group of one or more execution threads;

wait for any outstanding transactions for the group of one or more execution threads that affect the content of the registers associated with the threads of the group of one or more execution threads to complete; and when any outstanding register affecting transactions for the group of one or more execution threads that affect the content of the registers associated with the threads of the group of one or more execution threads have completed:

store to memory:

the content of the registers associated with the threads of the group of one or more execution threads; and a set of state information for the group of one or more execution threads, the set of state information including at least an indication of the last instruction in the shader program that was executed for the threads of the group of one or more execution threads;

and configured to:

in response to a command to resume the processing of an output being generated by the graphics processor whose processing was previously suspended:

for a group of one or more execution threads whose execution of a shader program for the output whose processing is being resumed was stopped when the processing of the output was suspended:

issue a corresponding group of one or more execution threads to the programmable execution unit to execute the shader program;

load from memory into registers associated with threads of the issued thread group a set of register content for the threads of the thread group that was written out to memory when processing of the thread group was suspended;

load from memory a set of thread group state information for the thread group including at least an indication of the last instruction in the shader program that was executed for the threads of the thread group when processing of the thread group was suspended; and after the register content and the thread group state data has been loaded:

resume execution of the shader program for the issued thread group after the indicated last instruction in the shader program that was executed for the threads of the thread group; and use the loaded content of the registers for the threads of the issued thread group when executing the shader program for the issued thread group.

Again, as will be appreciated by those skilled in the art, these embodiments of the technology described herein can, and in an embodiment do, include any one or more or all of the optional features of the technology discussed herein, as appropriate.

As will be appreciated from the above, the technology described herein is primarily concerned with the suspending (and resuming) of processing for thread groups that are currently executing a shader program when the need to suspend the generation of an output occurs.

However, the Applicants have further recognised that at the point at which a command to suspend processing of an output is received, there may be other processing "entities" for the output in question that are at different stages of the overall graphics processing pipeline that is generating the output. For example, there may be primitives within a sequence of primitives (e.g. a draw call) that is being processed for the output that may have yet to reach the fragment shader program execution stage of the graphics processing pipeline. Correspondingly, there may be primitives within the relevant sequence of primitives that have already finished their fragment shader processing, such that, e.g., final output rendered fragment data for those primitives has been generated at the point at which the command to suspend processing of the output is received.

In an embodiment, as well as suspending the processing of groups of threads that are currently executing a fragment shader program in the manner discussed above, the suspend (and subsequent resume) operation also takes account of and handles graphics processing entities, and in particular primitives, that are at other stages of the graphics processing pipeline when the suspend command is received.

For example, the Applicants have recognised that any primitives associated with the current output that have not yet entered the graphics processing pipeline when the suspend command is received can be simply issued into the graphics processing pipeline when processing is resumed, and processed as normal. Thus, in response to receiving a suspend command, the issuing any new primitives for the output to the graphics processing pipeline is in an embodiment stopped (in an embodiment immediately).

Similarly, any primitives within the sequence of primitives currently being processed for the output that are still in the order in which they were issued into the graphics processing pipeline, and for which the processing of those primitives has not yet produced any observable effects for the output (such that the processing of those primitives can be repeated again from the beginning without introducing artefacts into the output), are in an embodiment simply discarded (and their processing stopped) when the suspend command is received, with those primitives then being processed again from the beginning, as if they were new primitives, when generation of the output is subsequently resumed. In general, these will be primitives that have been issued to the graphic processing pipeline, but have not yet reached, or at least not yet completed, the rasterisation process.

There may also be primitives in the graphics processing pipeline that have begun to be processed to the extent that they may have produced observable effects for the output, and/or may no longer be in the order in which they were issued into the graphics processing pipeline. These primitives may in general be primitives that have been or are being rasterised to graphics fragments, but for which the graphics fragments have yet to start (enter) the fragment shading stage (the fragment shader program execution) of the graphics processing pipeline For such primitives, it may not be appropriate to simply repeat their processing again from the beginning, so in an embodiment, when a suspend command is received, the processing of such primitives is continued until the stage at which they are converted into thread groups for execution of the relevant fragment shader program, with the processing for those primitives then being suspended by suspending the fragment shader execution for the thread groups corresponding to those primitives in the manner of the technology described herein, once the processing of those primitives has reached the fragment shader execution stage. In this case therefore, such primitives will continue some of their processing when the suspend command is received, but will then be suspended at the fragment shader execution stage in the manner of the technology described herein.

There may also be a group of primitives for which (all of) the fragment shading operations have already completed when the command to suspend processing is received, and for which the fragment shading accordingly does not need to be, and therefore should not be, repeated (i.e. primitives that have already passed through the graphics processing pipeline and have accordingly been rendered to generate (or update) the rendered fragment data for the output that is being suspended). These primitives therefore are in an embodiment not processed again (and at all) when generation of the output is resumed.

In order to facilitate such operation, the graphics processor in an embodiment keeps track of those primitives that were simply discarded when the suspend command was received (and so should be processed again from the beginning when generation of the output is resumed), and those primitives for which some processing was continued and accordingly were suspended at the fragment shader execution stage.

This may be done as desired, but in an embodiment, a suspend operation "boundary" primitive identifying and indicating the first primitive that was not simply discarded is selected (and recorded) (which will thus be a primitive having a position within the sequence of primitives such that it can be guaranteed that all primitives in the sequence of primitives that are behind the position of the selected boundary primitive within the sequence of primitives are in order and have not produced any observable effect, whereas any primitives in the sequence of primitives that may be out of order and/or have produced an observable effect, are ahead of the selected boundary primitive).

Correspondingly, in an embodiment, a suspend operation "base" primitive identifying and indicating the last primitive in the sequence of primitives whose fragment shading had already been completed when the suspend command was received is identified (and recorded) (which will thus correspondingly identify the earliest primitive in the sequence of primitives for which the fragment shading operations have not been completed (or, equivalently, the first primitive for which the fragment shader program execution was suspended)).

The "boundary" and "base" primitives thus define the section of primitives whose processing should be resumed when processing of the output is resumed.

In an embodiment, suitable primitive identifiers identifying the positions of the boundary and base primitives are written out as part of the suspend operation, to allow the graphics processor to resume processing from the appropriate position in the primitive sequence.

Then, when generation of the output is to be resumed, the graphics processor in an embodiment uses the recorded boundary and base primitives to identify those primitives for the output for which the processing should be resumed in the manner of the technology described herein. Thus, the graphics processor can, and in an embodiment does, "fast forward" through the sequence of primitives for the output until it reaches the indicated "base" primitive, and then resumes processing of the sequence of primitives appropriately, starting from the position indicated by the base primitive. It will then resume processing of the primitives in the sequence until the position indicated by the "boundary" primitive is reached, and for any primitives that are behind the "boundary" primitive in the sequence, those primitives will be simply issued to the graphics processing pipeline from the beginning (as if they are completely new primitives to be processed).

In an embodiment, as well as writing out the various data, state information, etc., discussed above when a suspend command is received, the graphics processor in an embodiment also writes out any other data and information required to resume processing of the output.

Thus, for example, once all of the thread groups, primitives, etc., have been appropriately suspended in response to a suspend command, the graphics processor in an embodiment writes out the current rendered fragment data (the current buffers for the output) (e.g. colour, depth, etc., values) generated from the processing so far for the output, such that the rendered fragment data can be re-loaded when generation of the output is to be resumed. Any required output state data is in an embodiment also and correspondingly written out so that it can be re-loaded when generation of the output is to be resumed.

Correspondingly, the graphics processor in an embodiment loads back in the current rendered fragment data (buffers) (e.g. colour, depth, etc. values) and/or any state data that was written out when generation of the output was suspended, so as to restore and reuse that data when generation of the output is resumed.

Other arrangements would, of course, be possible.

Although the technology described herein has been described above with particular reference to a graphics processor and graphics processing (and the technology described herein is particularly applicable to graphics processors and graphics processing), the Applicants have recognised that the operation, etc., in the manner of the technology described herein would be applicable to any data processor including any type of multi-threaded (thread group based) execution engine which operates in a similar manner. For example, the technology described herein could equally be used in the case of a programmable multi-threaded (thread group based) neural network processing unit (NPU). Thus the technology described herein also extends more generally to data processors that are operable to execute programs for groups of execution threads.

Thus, another embodiment of the technology described herein comprises a data processor, the data processor comprising:

a programmable execution unit operable to execute programs, and in which when executing a program, the programmable execution unit executes the program for respective groups of one or more execution threads, each execution thread in a group of one or more execution threads corresponding to a respective work item of an output being generated; and a plurality of registers for storing data for execution threads executing a program, each execution thread when executing a program having an associated set of registers of the plurality of registers for storing data for the execution thread, the data processor further comprising a processing circuit configured to, in response to a command to suspend the processing of an output being generated by the data processor:

for a group of one or more execution threads currently executing a program for the output being generated:
  stop the issuing of program instructions for execution by the group of one or more execution threads;
  wait for any outstanding transactions that affect the content of the registers associated with the threads of the group of one or more execution threads for the group of one or more execution threads to complete; and
  when any outstanding transactions that affect the content of the registers associated with the threads of the group of one or more execution threads for the group of one or more execution threads have completed:
    store to memory:
      the content of the registers associated with the threads of the group of one or more execution threads; and
      a set of state information for the group of one or more execution threads, the set of state information including at least an indication of the last instruction in the program that was executed for the threads of the group of one or more execution threads.

Correspondingly another embodiment of the technology described herein there is provided a data processor, the data processor comprising:

a programmable execution unit operable to execute programs, and in which when executing a program, the programmable execution unit executes the program for respective groups of one or more execution threads, each execution thread in a group of one or more execution threads corresponding to a respective work item of an output being generated; and a plurality of registers for storing data for execution threads executing a program, each execution thread when executing a program having an associated set of registers of the plurality of registers for storing data for the execution thread;

the data processor further comprising a processing circuit configured to, in response to a command to resume the processing of an output being generated by the data processor whose processing was previously suspended:

for a group of one or more execution threads whose execution of a program for the output whose processing is being resumed was stopped when the processing of the output was suspended:
  issue a corresponding group of one or more execution threads to the programmable execution unit to execute the program;
  load from memory into registers associated with threads of the issued thread group a set of register content for the threads of the thread group that was written out to memory when processing of the thread group was suspended;
  load from memory a set of thread group state information for the thread group including at least an indication of the last instruction in the program that was executed for the threads of the thread group when processing of the thread group was suspended;
  and
  after the register content and the thread group state data has been loaded:
  resume execution of the program for the issued thread group after the indicated last instruction in the program that was executed for the threads of the thread group; and
  use the loaded content of the registers for the threads of the issued thread group when executing the program for the issued thread group.

Other embodiments of the technology described herein correspondingly provide corresponding methods of operating a data processor to perform a suspend operation and/or a resume operation in the manner of the technology described herein.

As will be appreciated by those skilled in the art, these embodiments of the technology described herein can, and in an embodiment do, include any one or more or all of the optional features of the technology described herein discussed herein, as appropriate.

In some embodiments, the data, e.g. graphics, processor comprises, and/or is in communication with, one or more memories and/or memory devices that store the data described herein, and/or store software for performing the processes described herein. The data, e.g. graphics, processor may also be in communication with a host microprocessor, and/or with a display for displaying images based on the data generated by the data, e.g. graphics, processor.

In an embodiment, the data, e.g. graphics, processor is part of an overall data processing system that comprises one or more memories and/or memory devices and a host processor (and, optionally, a display). In an embodiment, the host microprocessor is operable to execute applications that require data, e.g. graphics, processing by the data, e.g. graphics, processor, with the data, e.g. graphics, processor operating when required to perform processing for applications executing on the host processor.

Other arrangements would, of course, be possible.

The technology described herein can be used for all forms of output that a data, e.g. graphics processor (and processing pipeline) may be used to generate, such as in the case of a graphics processor frames (images) for display, render to texture outputs, etc. The output data values from the processing are in an embodiment exported to external, e.g. main, memory, for storage and use, such as to a frame buffer for a display.

The technology described herein is applicable to any suitable form or configuration of data, e.g. graphics, processor and data processing system. In an embodiment, the various functions of the technology described herein are carried out on a single data processing platform that generates and outputs data.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Subject to any hardware necessary to carry out the specific functions discussed above, the data processing system and graphics processor can otherwise include any one or more or all of the usual functional units, etc., that data processing systems and graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described in the context of a graphics processor operable to execute graphics shader programs.

FIG. 1 shows a typical computer graphics processing system.

An application 2, such as a game, executing on a host processor (CPU) 1 will require graphics processing operations to be performed by an associated graphics processing unit (GPU) (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

As shown in FIG. 1, the graphics processing system will also include an appropriate memory system 5 for use by the host CPU 1 and graphics processor 3.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, their associated data values are then stored in memory, ready for output, e.g. for display.

In the present embodiments, graphics processing is carried out in a pipelined fashion, with one or more pipeline stages operating on the data to generate the final output, e.g. frame that is displayed.

Figure 2:
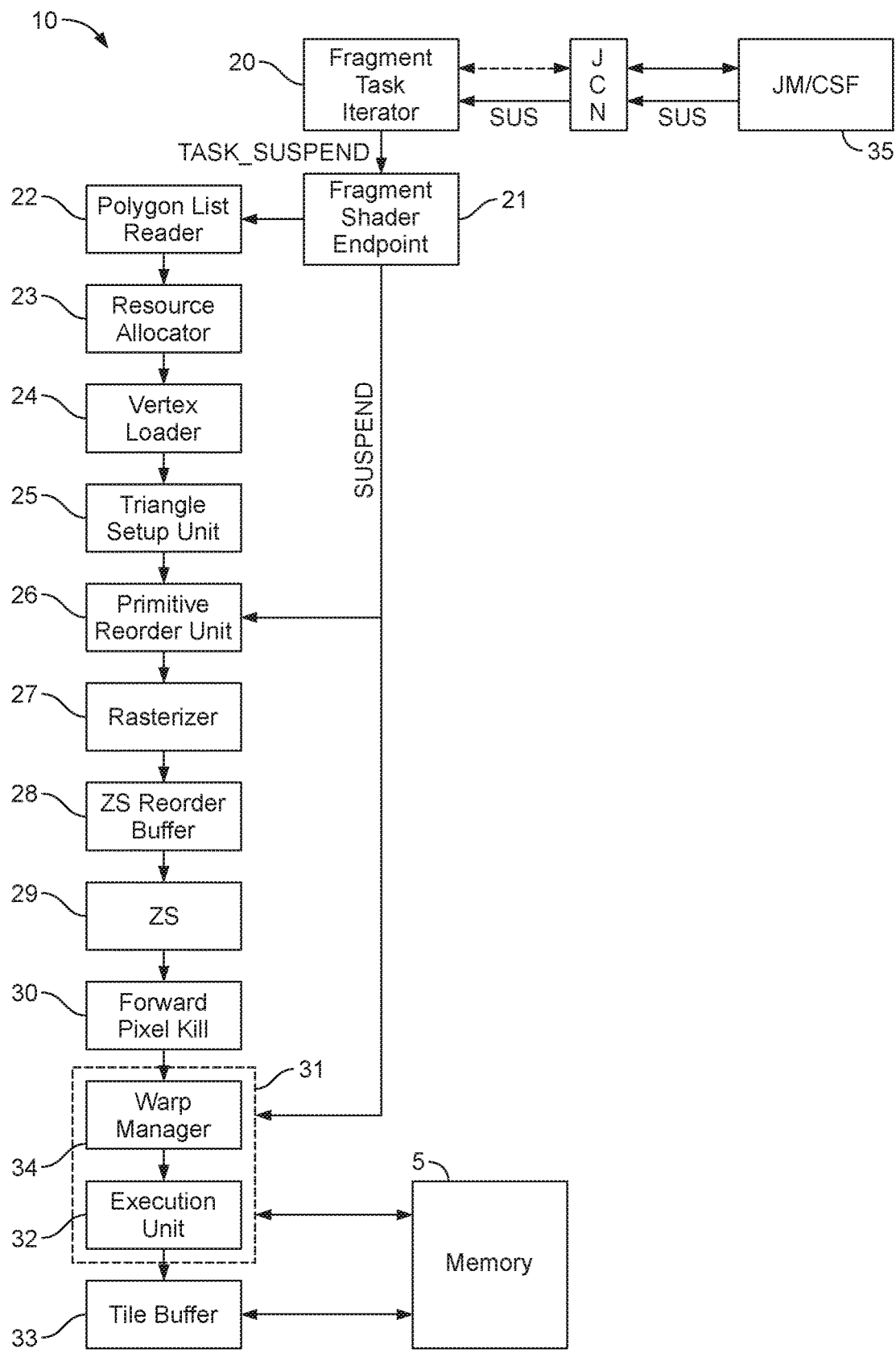
FIG. 2 shows schematically a graphics processing pipeline that can be operated in the manner of the technology described herein.

FIG. 2 shows an exemplary graphics processing pipeline 10 that may be executed by the graphics processor 3 in the present embodiment. The graphics processing pipeline 10 shown in FIG. 2 is a tile-based system, and will thus produce tiles of an output data array, such as an output frame to be generated. (The technology described herein is however also applicable to other systems, such as immediate mode rendering systems.) The output data array may typically be an output frame intended for display on a display device, such as a screen or printer, but may also, for example, comprise a "render to texture" output of the graphics processor, or other suitable arrangement.

FIG. 2 shows the main elements and pipeline stages of the graphics processing pipeline 10 according to the present embodiments. As will be appreciated by those skilled in the art, there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. Equally, some of the elements depicted in FIG. 2 need not be provided, and FIG. 2 merely shows one example of a graphics processing pipeline 10. It will also be appreciated that each of the stages, elements and units, etc., of the graphics processing pipeline as shown in FIG. 2 may be implemented as desired and will accordingly comprise, e.g., appropriate circuits and/or processing logic, etc., for performing the necessary operation and functions.

The graphics processing pipeline as illustrated in FIG. 2 will be executed on and implemented by the graphics processing unit (GPU) (graphics processor) 3, which will accordingly include the necessary functional units, processing circuits, etc., operable to execute the graphics processing pipeline stages.

FIG. 2 shows the stages of the graphics processing pipeline after a tiler (not shown) of the graphics processor has prepared the primitive lists (as the graphics processing pipeline 10 is a tile-based graphics processing pipeline).

(The tiler in effect determines which primitives need to be processed for different regions of the output. In the present embodiments, these regions may, e.g., represent a tile into which the overall output has been divided into for processing purposes, or a set of multiple such tiles. To do this, the tiler compares the location of each primitive to be processed with the positions of the regions, and adds the primitive to a respective primitive list for each region that it determines the primitive could (potentially) fall within. Any suitable and desired technique for sorting and binning primitives into tile lists, such as exact binning, or bounding box binning or anything in between, can be used for the tiling process.)

Once the tiler has completed the preparation of the primitive lists (lists of primitives to be processed for each region), then each tile can be rendered with reference to its associated primitive list(s).

To do this, each tile is processed by the graphics processing pipeline stages shown in FIG. 2.

A fragment task iterator 20 is thus provided that schedules processing work to the graphics processing pipeline 10.

The fragment task iterator 20 may thus schedule the graphics processing pipeline to generate a first output, which may, e.g. be a frame to display. In the present embodiments, wherein the graphics processing pipeline 10 is a tile-based system, in which the output has been divided into a plurality of rendering tiles, the graphics processing pipeline 10 iterates over the set of tiles for the first output, rendering each tile in turn.

As shown in FIG. 2, the graphics processor 3 includes an overall controller in the form of a job manager circuit (a command stream frontend circuit) 35, that is operable to receive tasks for the graphic processor 3 for processing from the host processor 1, which job manager 35 can then communicate the relevant jobs (tasks) to respective elements of the graphics processor and graphics processing pipeline 10, via an appropriate bus/interconnect, which in the present embodiment is in the form of a job control network (JCN) 36.

Thus, as shown in FIG. 2, the job manager 35 will, inter alia, issue fragment processing tasks to the fragment task iterator 20 for the fragment task iterator 20 to then schedule the appropriate fragment shading tasks to and onto the graphics processing pipeline 10.

For a given tile that is being processed, a primitive list reader (or 'polygon list reader') 22 thus identifies a sequence of primitives to be processed for that tile (the primitives that are listed in the primitive list(s) for that tile), and an ordered sequence of primitives for the tile is then issued into the graphics processing pipeline 10 for processing.

A resource allocator 23 then configures and manages the allocation of memory space for the depth (Z), colour, etc., buffers 33 for the tile of the output that is being generated. These buffers may, e.g., be provided as part of RAM that is located on (local to) the graphics processing pipeline (chip).

A vertex loader 24 then loads in the vertices for the primitives, which are then passed into a primitive set-up unit (or 'triangle set-up unit') 25 that operates to determine, from the vertices for the primitives, edge information representing the primitive edges.

Up to this point, the primitives are processed strictly in the order in which they were initially issued into the graphics processing pipeline 10. Furthermore, the processing so far has not yet produced any observable effects for the output (such that the processing could be repeated from the beginning without risking introducing any artefacts in the output by repeating the processing).

These stages thus define a 'first section' of the graphics processing pipeline 10 in which it can be guaranteed that the primitives are still in their initial order, and have not yet produced any observable effects for the output.

Before the primitives are passed to the rasteriser 27 the primitives may desirably be re-ordered, e.g. to improve the rasterisation efficiency, hidden surface removal, etc. Thus, the graphics processing pipeline 10 includes a primitive re-order unit 26 containing a buffer of primitives that may be subject to re-ordering.

Beyond this point, it can therefore no longer be guaranteed that the primitives are still in their initial specified order. Further, the rasterisation may start to produce observable effects for the output.

The stages of the graphics processing pipeline following the primitive re-ordering thus define a 'second section' of the graphics processing pipeline in which it can no longer be ensured that the primitives are in order, and in which the processing may have produced observable effects for the output (such that repeating this processing may start to introduce artefacts into the output).

The edge information for the re-ordered primitives is then passed to the rasteriser 27, which rasterises the primitives into a set of one or more sampling points and generates from the primitives individual graphics fragments having appropriate positions (representing appropriate sampling positions) for rendering the primitive.

The fragments generated by the rasteriser 27 are then sent onwards to the rest of the pipeline for processing.

For instance, in the present embodiments, the fragments generated by the rasteriser 27 are subject to (early) depth (Z)/stencil testing 29, to see if any fragments can be discarded (culled) at this stage. To do this, the Z/stencil testing stage 29 compares the depth values of (associated with) fragments issuing from the rasteriser 27 with the depth values of fragments that have already been rendered (these depth values are stored in a depth (Z) buffer that is part of the tile buffer 33) to determine whether the new fragments will be occluded by fragments that have already been rendered (or not). At the same time, an early stencil test is carried out.

To facilitate this, the fragments may be subject to further re-ordering in a ZS re-order buffer 28 upstream of the Z/stencil testing stage 29.

Fragments that pass the fragment early Z and stencil test stage 29 may then be subject to further culling operations, such as a 'forward pixel kill' test 30, e.g. as described in United States Patent Application Publication No. 2019/0088009 (Arm Limited), before the remaining fragments are then passed to a fragment shading stage, in the form of a shader core 31, for rendering.

The fragment shading stage 31 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs for the fragments, applying textures to the fragments, applying fogging or other operations to the fragments, etc., to generate the appropriate rendered fragment data.

In the present embodiment, the fragment shading stage is in the form of a shader pipeline (a programmable fragment shader), and thus is implemented by means of an appropriate shader (processing) core 31.

Thus, as shown in FIG. 1, in the present embodiment, the fragment shading stage (shader core) 31 includes a programmable execution unit (engine) 32 operable to execute fragment shader programs for respective execution threads (where each thread corresponds to one work item, e.g. an individual fragment, for the output being generated) to perform the required fragment shading operations to thereby generate rendered fragment data. The execution unit 32 can operate in any suitable and desired manner in this regard and comprise any suitable and desired processing circuits, etc.

In the present embodiments, the execution threads may be arranged into "groups" or "bundles" of threads, where the threads of one group are run in lockstep, one instruction at a time, i.e. each thread in the group executes the same single instruction before moving onto the next instruction. In this way, it is possible to share instruction fetch and scheduling resources between all the threads in a group. Such thread groups may also be referred to as "sub-groups", "warps" and "wavefronts". For convenience the term thread group will be used herein, but this is intended to encompass all equivalent terms and arrangements, unless otherwise indicated.

FIG. 2 accordingly also shows a thread group controller, in the form of a warp manager 34, that is configured to control the allocation of work items (e.g. fragments) to respective thread groups for the fragment shading operations to be performed by the execution unit 32, and the issuing of thread groups to the execution unit 32 for the execution of the fragment shading programs by respective thread groups.

As shown in FIG. 2, the fragment shading stage (shader core) 31 is also in communication with the memory 5.

Once the fragment shading is complete, the output rendered (shaded) fragment data is written to the tile buffer 33 from where it can, for example, be output to a frame buffer (e.g. in the memory 5) for display. The depth value for an output fragment is also written appropriately to a Z-buffer within the tile buffer 33. (The tile buffer stores colour and depth buffers that store an appropriate colour, etc., or Z-value, respectively, for each sampling point that the buffers represent (in essence for each sampling point of a rendering tile that is being processed).) These buffers store an array of fragment data that represents part (a tile) of the overall output (e.g. image to be displayed), with respective sets of sample values in the buffers corresponding to respective pixels of the overall output (e.g. each 2×2 set of sample values may correspond to an output pixel, where 4× multi-sampling is being used).

As mentioned above, the tile buffer 33 is normally provided as part of RAM that is located on (local to) the graphics processor.

Once a tile for the output has been processed, the data from the tile buffer(s) may thus be written back to an external memory output buffer, such as a frame buffer of a display device (not shown), e.g. in the memory 5. (The display device could comprise, e.g., a display comprising an array of pixels, such as a computer monitor or a printer.)

The next tile is then processed, and so on, until sufficient tiles have been processed to generate the entire output (e.g. frame (image) to be displayed). The process is then repeated for the next output (e.g. frame) and so on.

Figure 3:
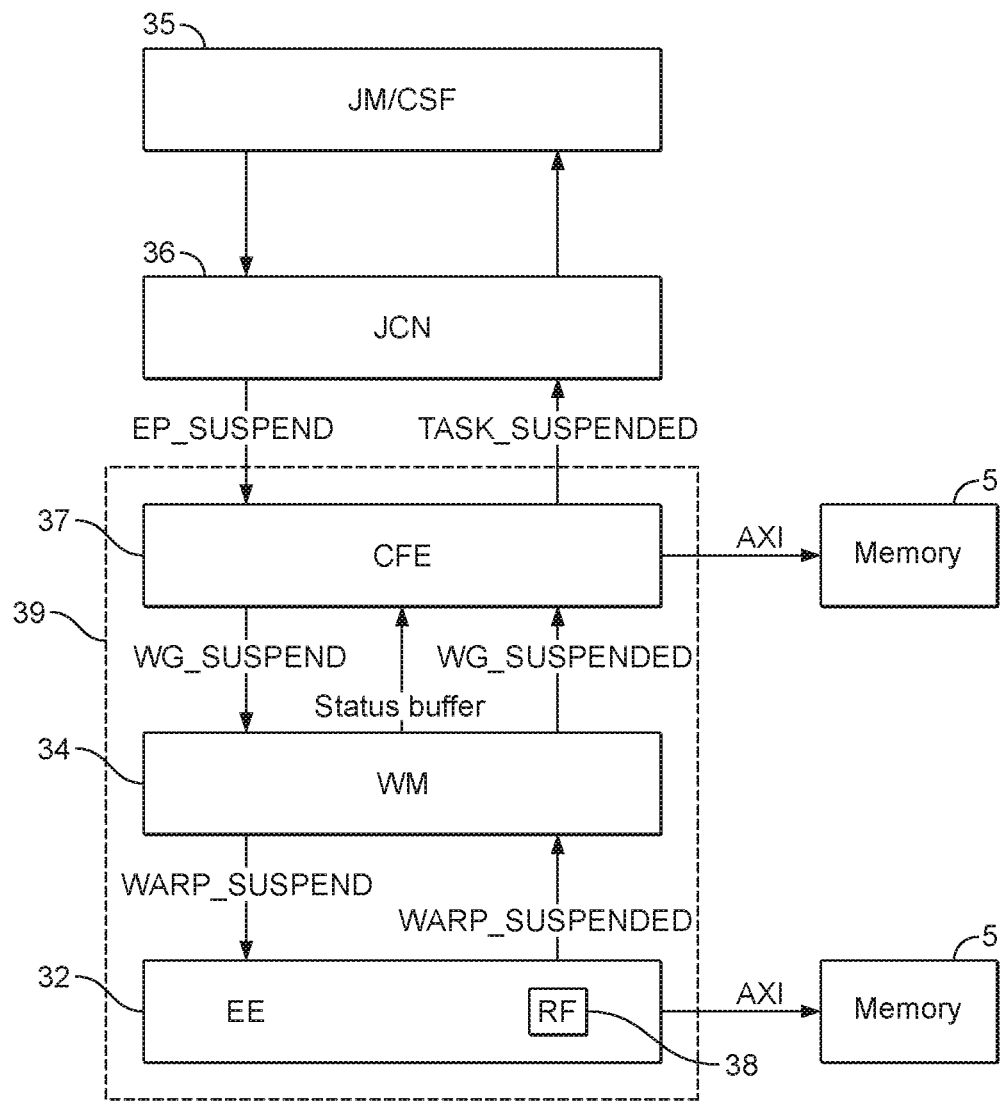
FIGS. 3 and 4 show schematically a shader core of a graphics processor in an embodiment of the technology described herein.
Figure 4:
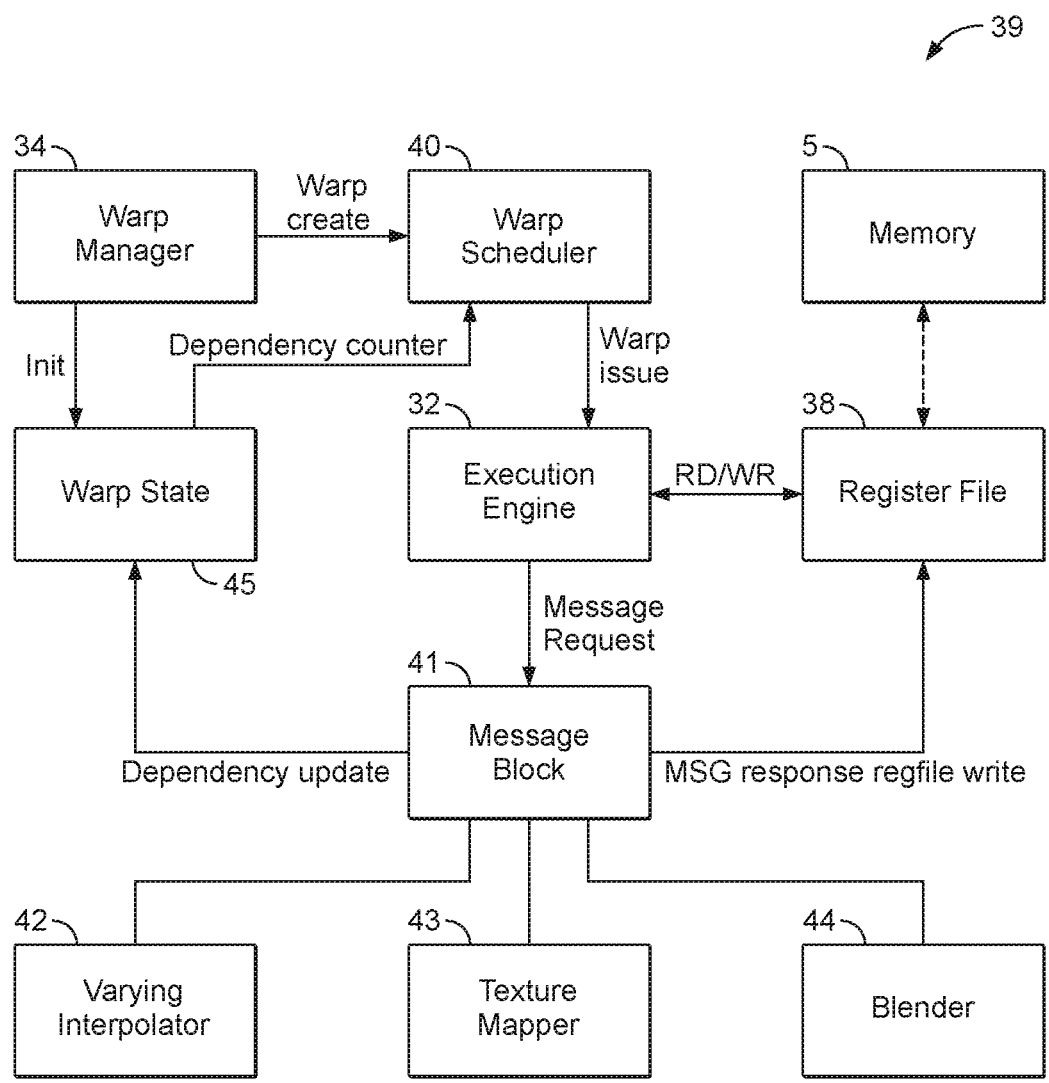

FIGS. 3 and 4 show an embodiment of a graphics processor shader core 39 (which may function as the fragment shading stage 31 or as a compute shader core, or as any other form of shader core, as required) in more detail. These Figures show in particular the operational units of the shader core of the graphics processor that are relevant to the suspending of thread groups that are executing a shader program in the manner of the technology described herein. (As will be appreciated by those skilled in the art, the shader core 39 may include other elements, components, etc., not shown in FIGS. 3 and 4. FIGS. 3 and 4 simply illustrate the elements and components, etc., of the shader core that are relevant to the operation of the present embodiments.)

FIG. 3 shows the interface between the job manager 35 and the shader core 39, together with the various messages, etc., that are provided and exchanged when fragment shader execution is suspended for an output in an embodiment of the technology described herein (this will be discussed in more detail below).

Thus, as shown in FIG. 3, the shader core 39 includes, in addition to a thread group controller (warp manager) 34, and a programmable execution unit (execution engine) 32, an appropriate shader core "frontend" 37, which is shown in FIG. 3 as being in the form of a compute frontend (CFE).

The shader core frontend 37 is operable to, inter alia, subdivide shading tasks received from the job manager 35 (via the job control network 36) into respective sub-tasks, which, in the case of a compute shading operation, will be appropriate work groups of the overall compute shading processing. The (compute) frontend 37 will then send the relevant sub-tasks (e.g. work groups in a compute shading context) to the thread group controller (warp manager) 34, which thread group controller will then operate to issue respective thread groups (warps) for each sub-task (work group) to the programmable execution unit (execution engine) 32 of the shader core, for the programmable execution unit 32 to then execute the appropriate shader program for the thread groups (warps).

As shown in FIG. 3, the programmable execution unit 32 also has an appropriate communication path (e.g. bus or interconnect) to the memory 5, as does the (compute) frontend 37. FIG. 3 also shows the registers (register file) 38 that are available to and used by the programmable execution unit 32 when executing a shader program for a group of threads.

FIG. 4 shows further elements of the shader core 39 in more detail.

As shown in FIG. 4, in operation of the fragment shader core 39, the thread group controller (warp manager) 34 will create (spawn) thread groups (warps), and provide those thread groups to a thread group (warp) scheduler 40, which will then issue the thread groups (warps) appropriately to the programmable execution unit 32 for shader program execution.

The warp manager 34 will also set up appropriate state data 45 for each thread group (warp) that it creates.

The programmable execution unit 32 will then execute the required shader program for the (execution threads of the) thread groups (warps) that it receives.

As shown in FIG. 4, the programmable execution unit 32 when executing a shader program for a thread group will, inter alia, read and write to appropriate registers of a register file 38 allocated to the threads of the thread group that is executing the shader program, and may also send messages requesting processing by "slave" hardware accelerators, such as a varying interpolator 42, a texture mapper 43 and a blender 44, to a message block (circuit) 41 (which in response to requests for slave accelerator processing from the programmable execution unit 32 will send appropriate messages to the relevant accelerator to trigger that processing (as shown in FIG. 4)).

The message block 41 is also operable to write the responses returned by the accelerators to the appropriate registers in the register file 38, and to update appropriate dependencies (e.g. that track when shader program execution for a thread group is awaiting a response from a slave accelerator) in the warp state record 45. The thread group (warp) state 45 is also provided to the thread group (warp) scheduler 40 for use when issuing thread groups (warps) to the programmable execution unit 32.

The present embodiments relate in particular to the situation where the generation of a first output by the graphics processor 3 is suspended before it can complete, e.g. to allow the graphics processor 3 to switch to generating a second, different output, and in particular to the suspending of shader program execution for a thread group when the generation of an output is to be suspended.

For example, this may be the case when the graphics processor is being shared between multiple concurrently running applications (as illustrated in FIG. 1), such that the graphics processor 3 may need to repeatedly switch between generating different outputs for the respective, different applications.

As shown in FIG. 2, when it is desired to switch between outputs, the job manager 35 will send an appropriate suspend command (SUS) via the job control network 36 to the graphics processing pipeline 10. This may, e.g., be in response to a command to suspend processing the current output received from the driver that is controlling the graphics processor to generate that output. This suspend command will be relayed, inter alia, to the fragment task iterator 20, which will then issue a command ("TASK_SUSPEND") to suspend processing of the current output.

The suspend command will, inter alia, be propagated, as shown in FIG. 2, to the shader core 39. In particular, as shown in FIG. 3, an appropriate suspend command (EP_SUSPEND) will be sent to the (compute) frontend 37 for the shader core 39. This then triggers the (compute) frontend 37 to start the suspend operation.

The compute frontend 37 will in this regard maintain an input queue (a list) of tasks that are to be processed for the output that is currently being processed and that is to be suspended, and will track the status of tasks in that queue, so as to track which tasks have been completed, which tasks are currently active, and which tasks have not yet been started.

When the suspend command is received, the compute frontend will accordingly identify from this record those tasks which have been completed, those tasks which have not yet started, and those tasks which are currently active (which will be the tasks whose shader program execution is currently in progress and so will need to be suspended in the manner of the technology described herein).

In the present embodiment, the compute frontend 37 sends to the job manager 35 an appropriate "suspend state" indication for each task in the queue (i.e. for each outstanding run command in the queue) for the output whose processing is being suspended. Thus, for any tasks which are in the input queue and have not yet started, the command frontend 37 sends a TASK_NOT_STARTED status. Correspondingly for any tasks which have completed and therefore do not need to be resumed when the processing for the output that is being suspended is resumed, a status "TASK_DONE" is sent.

On the other hand, any currently active tasks (i.e. that the compute frontend 37 has already sub-divided to sub-tasks (i.e. work groups in this compute shading example) and distributed to the thread group (warp) manager 34)) will need further processing in respect of the suspend operation.

Thus, for any such currently active task, the compute frontend 37 will issue a suspend command (WG_SUSPEND) for each sub-task for that task that the compute frontend has divided that task into (which in a compute shading context will be a work group). Thus, as shown in FIG. 3, the compute frontend 37 will issue a corresponding work group suspend (WG_SUSPEND) command to the warp manager 34 for each work group for the task in question.

In response to the work group suspend command, the warp manager 34 will correspondingly identify all the thread groups (warps) within that work group, and for each thread group (warp) then issue a corresponding thread group suspend (WARP_SUSPEND) command to the thread group (warp) scheduler 40.

In this way, the suspend command is propagated appropriately to the individual thread groups (warps) that are currently executing the shader program and so whose shader program execution needs to be suspended.

In response to a thread group suspend command for a thread group from the warp manager 34, the warp scheduler 40 enters into a "suspend" mode of operation for the affected thread group (warp).

Figure 5:
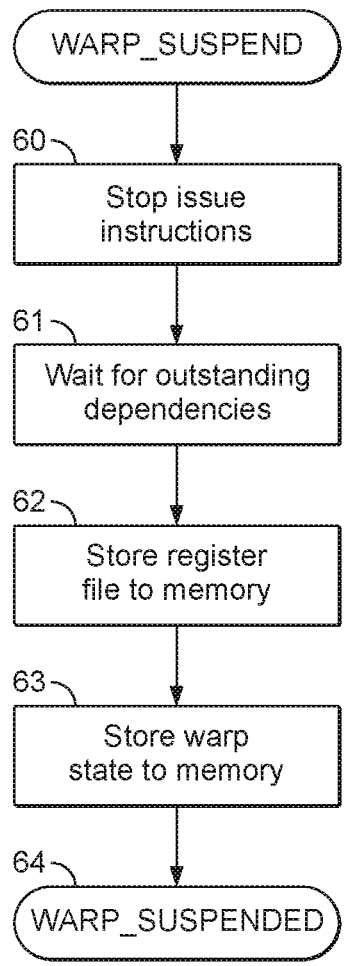
FIGS. 5 and 6 show the suspending of processing in an embodiment of the technology described herein.

This suspend mode of operation is shown in FIG. 5.

As shown in FIG. 5, for a thread group (warp) whose shader program execution is to be suspended, the warp scheduler 40 first stops the issuing of further instructions for execution for the thread group (warp) in question (step 60). Thus the thread group will complete its execution (where and as appropriate) of any already issued shader program instruction, but no further instructions will be issued for execution by the thread group.

The suspend operation will then wait for all outstanding transactions that affect the content of the registers for the thread group to complete (step 61). This comprises both waiting for reads and writes between the register file and the memory for the threads of the thread group to complete and for any message responses from the slave units (the varying interpolator 42, texture mapper 43 and blender 44 in this case) to write to the register file (as shown in FIG. 4).

(The suspend operation only waits for outstanding register-affecting transactions to be completed, it does not wait for any other dependencies (such as barrier dependencies) to be met.)

The completion of the outstanding register-affecting transactions (of the outstanding register-affecting dependencies) can be tracked and checked in any suitable and desired manner, e.g., by using appropriate dependency counters (slots) to keep track of outstanding dependencies for the threads of the thread group.

Once all the outstanding register-affecting transactions have been completed (and any already issued instructions have been executed), then, as shown in FIG. 5, the register file content for the thread group (step 62), and the current thread group (warp) state (step 63), are stored to memory.

The thread group state information that is stored to memory comprises all the state that is needed to subsequently resume execution of all the shader program at the suspended instruction for the thread group (warp) in question. In the present embodiments, the stored thread group state includes an appropriate set of state information for each thread in the thread group, including the thread program counter (PC), CallStack depth, discard state (if supporting fragment suspend), terminate state, lane active state and any barrier dependency state (count) for the thread.

In the present embodiments, the register file content and the thread group state are stored to memory by executing a thread group "suspend routine", which in the present embodiments is run as a micro-coded sequence in the message block 41 of the shader core 39.

An exemplary instruction sequence for this suspend routine is shown below:

STORE.i128.pack.estream.slot0 r0:r3 suspend_buffer_base
STORE.i128.pack.estream.slot0 r4:r7 suspend_buffer_base+16
STORE.i128.pack.estream.slot0 r8:r11 suspend_buffer_base+32
STORE.i128.pack.estream.slot0 r12:r15 suspend_buffer_base+48
STORE.i128.pack.estream.slot0 r16:r19 suspend_buffer_base+64
STORE.i128.pack.estream.slot0 r20:r23 suspend_buffer_base+80
STORE.i128.pack.estream.slot0 r24:r27 suspend_buffer_base+96
STORE.i128.pack.estream.slot0 r28:r31 suspend_buffer_base+112
STORE_STATE.pack.estream.slot0.wait0 suspend_buffer_base+128

As can be seen, this instruction sequence comprises a sequence of STORE instructions that store the relevant register content (in this case assuming that there are 32 registers per thread, but such a sequence of instructions can correspondingly be used for any arbitrary register allocation to threads), together with a final "STORE_STATE" instruction which stores the required thread group (warp) state, at progressively increasing memory addresses in a "suspend buffer" in memory.

In this way, the up-to-date register content and warp state for the thread group are stored together in a "suspend buffer" for the thread group (warp) in memory.

As can be seen from the instruction sequence above, the suspend routine includes an appropriate "wait" dependency (wait 0) to monitor for the completion of the suspend routine.

When the suspend routine has completed (in this case, the dependency counter 0 (slot 0) has cleared), then an indication that the thread group has been successfully suspended (WARP_SUSPENDED) is sent to the warp manager 34 (step 64). (It would also be possible to allow for an error signal to be returned in the case that for some reason the suspend sequence failed.)

This operation is repeated for each thread group (warp) in the work group in question whose shader program execution is to be suspended. Thus there will be a sequence of thread group (warp) suspend buffers stored to the memory.

The above discusses the operation in particular for a thread group that is currently executing the shader program when the command to suspend the generation of the output in question is received.

The Applicants have further recognised in this regard that there may be thread groups for a given sub-task (e.g. work group) that have either not yet started shader program execution when the suspend command is received, or that have already completed the shader program execution when the suspend command is received.

In order therefore to allow the shader program execution to be resumed for those thread groups that require it when a generation of suspended output is resumed, in the present embodiments, the warp scheduler 40 returns to the warp manager 34 a thread group (warp) suspended state indication for each thread group in the sub-task (work group) that is being suspended.

Thus, in the present embodiments, each thread group (warp) for the work group in question returns a warp suspended state which indicates either that the warp was not started (WARP_NOT_STARTED), that the warp was already completed (WARP_DONE), that the warp was suspended (WARP_SUSPENDED), or that there was an error. Thus each warp (thread group) responds with a 2-bit warp suspend state indication.

In the present embodiments, the warp scheduler 40 is configured to send the warp suspended status to the warp manager 34 for each thread group in a work group in the thread group (warp) issue order (age order). This helps to simplify the buffering and the amount of data that needs to be stored to keep track of which suspend indication relates to which thread group for the work group.

To facilitate this, in the present embodiments the thread groups are correspondingly constrained to retire during the suspend operation from the programmable execution unit 32 to the warp manager 34 in age order (in contrast to normal operation where thread groups, e.g., may be retired in any order and the warp manager will, e.g., simply track that all thread groups have been completed).

The warp manager 34 then stores the warp suspended state indications from the thread groups (warps) that it receives for the work group in question in a work group warp "suspend status" buffer (and in the thread group (warp) issue (age) order). The work group warp suspend status buffer thus contains one entry (indication) for each warp in the warp group in a linear order at progressively increasing memory addresses in the issue (age) order of the warps for the work group. Thus, in the case where the (largest) number of warps in a work group is 64, the warp manager 34 will prepare a 128 bit buffer storing a 2 bit suspend state indication for each warp in the work group.

The warp manager 34 will track the thread group (warp) responses to determine when all the warps from a work group have responded (and been suspended, as appropriate). It will then, as shown in FIG. 3, send to the compute frontend 37 a suspend state indication (WG_SUSPENDED) for the work group in question, together with the corresponding work group warp status buffer. If all warps in a work group were completed (WARP_DONE), then the warp manager responds with a work group suspend state of "work group done" (WG_DONE). Correspondingly, if all the warps in the work group were in the "not started state" (WARP_NOT_STARTED), the warp manager will respond with a work group suspend state of not started (WG_NOT_STARTED). If any warps within the warp group were suspended (i.e. have the state WARP_SUSPENDED), then the warp manager will return a work group suspend state of work group "suspended" (WG_SUSPENDED).

When it receives the work group suspend status indication and the corresponding work group warp suspend status buffer, the command frontend 37 writes the work group warp suspend status buffer to memory for future use.

Again, the work groups are suspended and respond in their linear issue (age) order, and so the compute frontend simply writes the relevant work group warp suspend status buffers to the memory in linear order.

In the case where there is an unmet barrier dependency for a work group, the current barrier count for the work group is in an embodiment also stored to the suspend buffer, with the state information for each thread in the work group also including an indication of whether the thread was currently waiting for the barrier dependency or not. This will then allow that barrier dependency to be appropriately recreated when resuming the processing.

The above operation is repeated for each work group within the task that is being suspended. Again, an appropriate work group suspend status buffer indicating the suspend status of all the work groups within the task in question is stored, so that the suspend status of the work groups within the task can be identified when processing of the output is to be resumed.

Again, in the present embodiments, the work groups are all correspondingly suspended in the work group issue (age) order, as that again simplifies the buffering of the data (as the warp manager will only need to maintain and manage a single work group suspend status buffer at any one time), and reduces the amount of data that needs to be stored to keep track of the work groups' suspended status.

(Other arrangements, such as the writing of the suspend status indications with appropriate identifiers (which would then avoid the need to write the suspend status indications in strict linear order) could be used if desired, albeit at the expense of the need to store additional data.)

Figure 6:
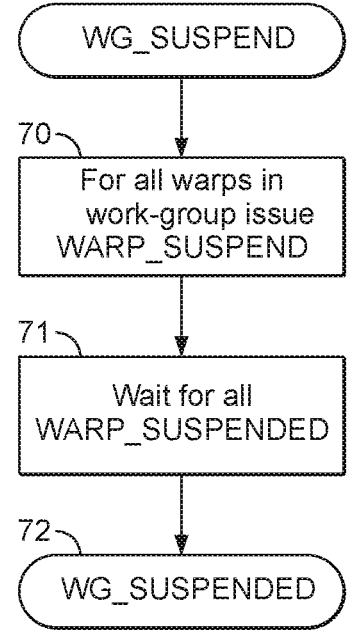

FIG. 6 illustrates this operation of the warp manager 34. Thus as shown in FIG. 6, in response to the work group suspend command, the warp manager will issue a thread group (warp) suspend command for each thread group in the work group in question (step 70) and then wait for all the thread groups (warps) in the work group to be suspended (step 71), before returning a work group suspended status indication to the compute frontend (step 72).

Once all the sub-tasks (work groups) for the given task have been appropriately suspended, then the compute frontend responds with an appropriate task suspend status signal (TASK_SUSPENDED) to the job manager 35 via the job control network 36, based on the returned suspend status for all the work groups for the task in question. If all the work groups are in the suspend status "done", the task response is that the task is done (TASK_DONE). If all the work groups for the task were in the state "not started", then the task response is correspondingly task "not started" (TASK_NOT_STARTED). Otherwise (i.e. in the case where some of the work groups at least were suspended), the task response is that the task was suspended (TASK_SUSPENDED).

This is repeated for each task that falls to be suspended when the command to suspend the processing is received.

Once all the currently active tasks have been suspended and the status of all the necessary tasks has been returned, the compute frontend responds to the job manager 35 with a "DONE" signal (or similar), to indicate that the suspend operation has been completed.

The job manager also correspondingly maintains and stores a record of the suspend status of all the tasks, so that the tasks that need to be resumed, etc., when processing of the output is resumed, can be identified.

The above describes the operation when processing of an output is to be suspended. As will be appreciated from the above, as the processing of the output that been suspended has not been completed, the processing of the output will need to be resumed at a later time.

In the present embodiments, the resume operation is essentially the reverse (the inverse) of the above-described suspend operation.

Thus, when the processing of a suspended output is to be resumed (e.g., as indicated by the relevant driver), the job manager 35 will send an appropriate resume command to the graphics processing pipeline, which resume command will, inter alia, be propagated to the shader core 39 (e.g. fragment shading stage 31). This then triggers the compute frontend 37 to start the resume operation.

The compute frontend 37 will then, using the stored task suspend status indications (buffer), identify those tasks whose processing was completed when the suspend command was received (and so that do not need processing again for the resume operation), those tasks which were suspended when the suspend command was received (and so whose processing will need to be completed), and those tasks which were not yet stated when the suspend command was received (and so which will accordingly need processing in the normal manner from the beginning).

Thus, for any suspended task, the compute frontend 37 will issue a resume command (WG_RESUME) for each sub-task (i.e. work group) for that task to the warp manager 34.

In response to the work group resume command, the warp manager 34 will correspondingly identify all the thread groups (warps) within that work group, and for each thread group then issue a corresponding thread group resume (WARP_RESUME) command to the thread group (warp) scheduler 40.

In response to the work group resume command, the warp manager 34 will retrieve the work group warp status buffer from the memory, and determine therefrom which warps (thread groups) for the work group in question were status "WARP DONE", were status "WARP SUSPENDED", and were status "WARP NOT STARTED". The warp manager 34 will then issue thread groups (warps) to the warp scheduler 40 for the processing of the warps (thread groups) to be resumed accordingly.

Thus for thread groups (warps) with status "WARP DONE" (i.e. that have already been completed), the warp manager 34 will not issue those warps again (as they should not be run again).

However, any thread group (warp) with status "WARP SUSPENDED" or "WARP NOT STARTED" will be issued again to the warp scheduler 40.

In the present embodiments, the thread groups are (re-)issued to the warp scheduler in their original issue (age) order by the warp manager 34, such that once the first in the thread group (warp) having status "WARP NOT STARTED" has been reached, it can be assumed that from that point all warps (thread groups) for the sub-task (work group) in question will be "WARP NOT STARTED". Any thread groups (warps) with "WARP NOT STARTED" status should be run as normal (i.e. issued to the warp scheduler 40 for execution of the shader program from the beginning in the normal manner).

For any thread group (warp) that is issued by the warp manager 34 having a status "SUSPENDED" (which thread groups will precede any "WARP NOT STARTED" thread groups in the issue order), the warp scheduler 40 will issue that thread group to the programmable execution unit for execution 32, using a "RESUME" mode of operation for the thread group (warp) (as any thread group (warp) with status "WARP SUSPENDED", should be run again, but resuming at the appropriate point in the shader program execution).

In the case where there was an outstanding barrier dependency for the work group, then the previously stored barrier count will also be restored (as discussed above) to allow the barrier dependency to be appropriately resumed when the processing for the work group is resumed.

Figure 7:
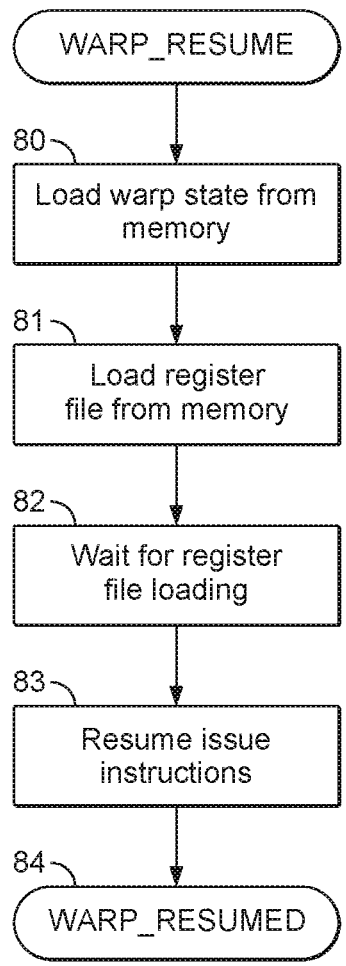
FIGS. 7 and 8 show the resuming of processing in an embodiment of the technology described herein.

The resume operation for a thread group (warp) is shown in FIG. 7.

Thus, as shown in FIG. 7, for a thread group (warp) whose shader program execution is to be resumed, the previously stored warp state will first be loaded from memory (step 80). The corresponding register file content for the thread group in question will then also be loaded from memory into the appropriate registers for the thread group (step 81).

Once the register file has been loaded (step 82), then the issuing of instructions for execution by the threads of the thread group (warp) will be resumed, starting at the current instruction for the thread indicated by the stored warp state (e.g., by using the stored PC for the thread group as an indirect branch into the shader program being executed) (step 83).

In the present embodiments, the resume operation illustrated in FIG. 7 is again performed by executing a thread group "RESUME ROUTINE" as a micro-coded sequence in the message block 41 of the shader core, e.g. as a prologue to starting the shader program execution itself.

An exemplary instruction sequence for this resume routine is shown below:

LOAD.i128.pack.estream r0:r3 suspend_buffer_base
LOAD.i128.pack.estream r4:r7 suspend_buffer_base+16
LOAD.i128.pack.estream r8:r11 suspend_buffer_base+32
LOAD.i128.pack.estream r12:r15 suspend_buffer_base+48
LOAD.i128.pack.estream r16:r19 suspend_buffer_base+64
LOAD.i128.pack.estream r20:r23 suspend_buffer_base+80
LOAD.i128.pack.estream r24:r27 suspend_buffer_base+96
LOAD.i128.pack estream r28:r31 suspend_buffer_base+112
LOAD_STATE.pack.estream suspend_buffer_base+128// Indirect branch into shader Again, this instruction sequence comprises a sequence of load instructions that load the relevant register content from the memory into the registers for the thread group (warp) whose processing is being resumed, followed by a LOAD_STATE instruction which loads the required thread group (warp) state from the memory (and which will, among other things, update the program count (PC) in the warp state to thereby indicate the next instruction to be executed when the shader program execution is resumed for the thread group (warp)).

When the resume routine has completed, then an indication that the shader program execution for the thread group has been successfully resumed (WARP_RESUMED) is sent to the warp manager 34 (step 84). (Again, an error signal could be returned in the case that for some reason the resume sequence failed.)

This operation is repeated for each thread group (warp) in the work group in question whose shader program execution is to be resumed (whose shader program execution was previously suspended partway through).

Again, the warp manager 34 will track the thread group (warp) responses to determine when all the warps from a work group have been resumed (as appropriate). It will then send to the compute frontend 37 a resume state indication (WG_RESUMED) for the work group in question.

This operation is repeated for each work group within the task that is being resumed.

Figure 8:
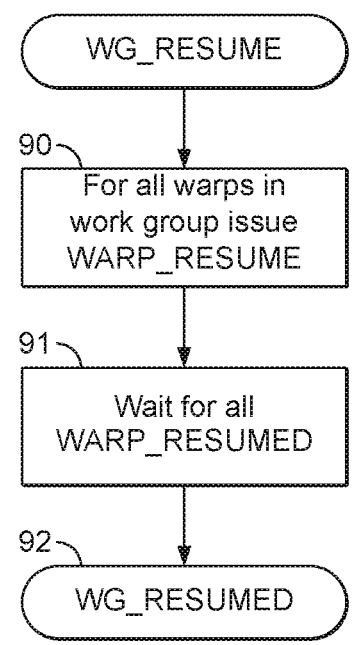

FIG. 8 illustrates this operation of the warp manager 34. Thus as shown in FIG. 8, in response to a work group resume command, the warp manager will issue a thread group (warp) resume command for each thread group in the work group in question (step 90) and then wait for all the thread groups (warps) in the work group to be resumed (step 91), before returning a work group resumed status indication to the compute frontend (step 92).

Once all the work groups of a given task have been appropriately resumed, then the compute frontend can again respond with an appropriate task resume status signal to the job manager 35.

This is repeated for each task that falls to be resumed when the command to resume the processing is received.

The outstanding tasks for the output in question will then be executed to completion (or until another suspend command is received).

FIGS. 3 and 5 to 8 show the arrangement in the case where the graphics processor is generating a compute shading output and thus the shader program that is being executed is a compute shader. However, the corresponding operation would be used where the graphics processor is performing other graphics processor operations and executing other forms of graphics shader programs, such as a vertex shader or a fragment shader.

The above describes the suspending (and resuming) of processing for thread groups that are currently executing a shader program when the need to suspend the generation of an output occurs in the present embodiment. The applicants have further recognised that at the point at which a command to suspend processing of an output is received, there may be other processing "entities" for the output in question that are at different stages of the overall graphics processing pipeline that is generating the output.

Thus, in an embodiment, as well as suspending the processing of thread groups that are currently executing a shader program in the manner discussed above, the suspend (and subsequent resume) operation also takes account of and handles other graphics processing entities, and in particular primitives, that are at other stages of the graphics processing pipeline when the suspend command is received.

FIG. 2 illustrates this, and shows that in addition to the suspend command being sent to the shader core (fragment shading stage) 31, the suspend command is also issued by the fragment shader endpoint 21 to the polygon list reader 22 and the primitive reorder unit 26. This is then used to control the suspension and resumption of the processing of primitives that are earlier in the pipeline when the suspend command is received.

In particular, in addition to the operation described above in relation to the suspending of shader program execution for thread groups, in the present embodiments, in response to a suspend command, the fragment shader endpoint 21 also stops issuing any new tiles to the graphics processing pipeline 10 for rendering and the primitive list reader 22 accordingly stops issuing any new primitives.

At the same time, the suspend operation is signalled to the primitive re-order unit 26 which then determines a suitable suspend operation boundary primitive at which to suspend the current sequence of primitives.

In the present embodiments, the selected boundary primitive is the last primitive in the primitive re-order unit 26 that is guaranteed to still be in order, and for which the processing thus far has not produce any observable effects for the output.

The primitive re-order unit 26 then responds with a primitive identifier identifying the position of the selected boundary primitive within the sequence of primitives for the rendering tile that is currently being processed, as well as a tile identifier identifying the tile in question. The tile buffer 33 is then notified which tile is to be suspended.

The primitive re-order unit 26 then discards all primitives in the sequence of primitives for the tile that are behind the selected boundary primitive (i.e. that are earlier in the pipeline than the selected boundary primitive).

However, the processing of any primitives in the sequence that are ahead of the selected boundary primitive, and that are therefore further ahead in the graphics processing pipeline, is continued, until those primitives reach the shader program execution stage, at which point their processing is suspended by suspending the shader program execution for thread groups corresponding to the primitives in the manner of the present embodiments.

There may also be a group of primitives for which (all of) the fragment shading operations have already completed when the command to suspend processing is received.

Thus, in the present embodiment, a suspend operation "base" primitive identifying and indicating the last primitive in the sequence of primitives whose fragment shading had already been completed when the suspend command was received is also identified (and recorded).

The "boundary" and "base" primitives thus define the section of primitives whose processing should be resumed when processing of the output is resumed.

Once the processing of all primitives is suspended, the current (updated) rendered fragment data (e.g. colour, depth, etc., values) for the tile that was suspended is then written out to a suitable suspend buffer, together with data identifying the selected boundary primitive and the tile identifier.

The generation of the output is then suspended such that the graphics processor can start generating a different output.

When processing of the output is to be resumed, essentially the reverse operation is performed.

Thus, when it is desired to resume processing of the output in response to receiving the resume command, the fragment shader endpoint 21 reads in data identifying the tile and the recorded boundary and base primitives to identify those primitives for the output for which the processing should be resumed in the manner of the present embodiments.

The fragment shader endpoint 21 can then resume processing for the identified rendering tile for which the processing was suspended. At this point, the tile (colour, depth, etc.) buffer(s) for the identified tile that were written out to the suspend buffer when the processing was suspended are re-loaded.

Correspondingly, and in parallel with this, the primitive list reader 26 is able to fast-forward through the sequence of primitives for the tile to the base primitive, and then resumes processing of the sequence of primitives appropriately, starting from the position indicated by the base primitive. It will then resume processing of the primitives in the sequence until the position indicated by the "boundary" primitive is reached, and for any primitives that are behind the "boundary" primitive in the sequence, those primitives will be simply issued to the graphics processing pipeline from the beginning (as if they are completely new primitives to be processed).

Although the present embodiments have been described above with particular reference to a graphics processor and graphics processing, the operation in the manner of the technology described herein would equally be applicable to any form of multi-threaded data processor that executes programs for thread groups, such as a programmable multi-threaded neural network processor.

As will be appreciated from the above, the technology described herein, in embodiments at least, provides an efficient mechanism for suspending (and subsequently resuming) the execution of a, e.g. shader, program by, e.g., a graphics processor, and at an arbitrary instruction boundary in the program.

This is achieved, in embodiments of the technology described herein at least by, inter alia, after waiting for any outstanding register-affecting transactions to complete, storing the current register content and state information for a thread group to be suspended to memory, and then restoring that data, etc., when resuming the execution of the program for the thread group.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a data processor that includes a programmable execution unit operable to execute programs and one or more slave units that can be used by the programmable execution unit when the programmable execution unit is executing a program to perform particular slave unit processing operations, and in which when executing a program, the programmable execution unit executes the program for respective groups of one or more execution threads, each execution thread in a group of execution threads corresponding to a respective work item of an output being generated, and each execution thread having an associated set of registers for storing data for the execution thread, the method comprising:

in response to a command to suspend the processing of an output being generated by the data processor that is received when a plurality of groups of one or more execution threads are currently executing a respective program for the output whose processing is to be suspended, stopping the processing of all of the groups of one or more execution threads that are currently executing a respective program for the output whose processing is to be suspended by:

for each group of one or more execution threads of the plurality of groups of one or more execution threads that are currently executing respective programs for the output being generated:

stopping the issuing of program instructions for execution by the group of one or more execution threads;

waiting for any outstanding transactions that affect the content of the registers associated with the threads of the group of one or more execution threads for the group of one or more execution threads to complete, wherein said outstanding transactions include any outstanding slave unit transactions corresponding to processing operations being performed by a respective slave unit and for which the results will be written to the registers associated with the threads of the group of one or more execution threads; and when any outstanding transactions, including any outstanding slave unit transactions, that affect the content of the registers associated with the threads of the group of one or more execution threads for the group of one or more execution threads have completed:

storing to memory:

the content of the registers associated with the threads of the group of one or more execution threads; and a set of state information for the group of one or more execution threads, the set of state information including at least an indication of the last instruction in the program that was executed for the threads of the group of one or more execution threads;

such that the method comprises, in response to the command to suspend the processing of an output being generated by the data processor:

for each group of one or more execution threads of the plurality of groups of one or more execution threads that are currently executing a respective program for the output whose processing is to be suspended:

waiting for any of said outstanding slave unit transactions for which the results will be written to the registers associated with the threads of the group of one or more execution threads to complete before storing to memory the set of state information for the group of one or more execution threads and the content of the registers associated with the threads of the group of one or more execution threads.

2. The method of claim 1, wherein the suspending of the processing for the output being generated is performed by and under the control of the driver for the data processor for the output that is being suspended.

3. The method of claim 1, comprising:

for each group of one or more execution threads of the plurality of groups of one or more execution threads that are currently executing a respective program for the output whose processing is to be suspended, storing the content of the registers and the set of state information for the group of one or more execution threads to memory once any outstanding transactions that affect the content of the registers associated with the threads of the group of one or more execution threads for the group of one or more execution threads have completed, without waiting for any outstanding barrier dependencies for the group of one or more execution threads to be met.

4. The method of claim 1, comprising:

for each group of one or more execution threads of the plurality of groups of one or more execution threads that are currently executing a respective program for the output whose processing is to be suspended, including in the set of state information that is stored for the thread group an indication of any outstanding barrier dependencies for the threads of the thread group at the time that the thread group was suspended.

5. The method of claim 1, comprising:

for each group of one or more execution threads of the plurality of groups of one or more execution threads that are currently executing a respective program for the output whose processing is to be suspended, storing the content of the registers and the set of state information for the group of one or more execution threads together in a suspend data buffer for the group of one or more execution threads.

6. The method of claim 1, comprising:

for each group of one or more execution threads of the plurality of groups of one or more execution threads that are currently executing a respective program for the output whose processing is to be suspended, the data processor storing the register content and the state information for the thread group in the memory by executing a sequence of instructions that store the register content and the thread group state information in memory.

7. The method of claim 1, comprising:

for each group of one or more execution threads of the plurality of groups of one or more execution threads that are currently executing a respective program for the output whose processing is to be suspended, also storing an indication that the thread group's processing has been suspended.

8. The method of claim 1, comprising:

suspending the processing of a set of plural groups of one or more execution threads, the set of plural groups of one or more execution threads including the plurality of groups of one or more execution threads that are currently executing a respective program for the output whose processing is to be suspended; and for each group of execution threads in the set, storing a processing status of the thread group at the time the processing of the set of plural groups of one or more execution threads was suspended.

9. The method of claim 1, further comprising:
the data processor receiving a command to resume processing of the suspended output, and, in response to receiving the command to resume processing of the suspended output:
for a thread group whose program execution was suspended partway through when processing of the output was suspended:
issuing a corresponding group of one or more execution threads to the programmable execution unit to execute the program;
loading the register content for the threads of the thread group that was written out when processing of the thread group was suspended to registers associated with threads of the issued thread group;
loading the thread group state information for the thread group including at least the indication of the last instruction in the program that was executed for the threads of the thread group;
and, after the register content and thread group state data has been loaded:
resuming execution of the program for the issued thread group after the indicated last instruction in the program that was executed for the threads of the thread group; and
using the loaded content of the registers for the threads of the thread group when executing the program for the issued thread group.

10. The method of claim 9, comprising:
in response to receiving the command to resume processing of the suspended output:
first identifying one or more groups of one or more execution threads whose execution of a program for the suspended output was suspended when the processing of the output was suspended from a previously stored set of thread group suspend status indications for the output; and
then, for each such identified group of one of more execution threads, resuming the execution of the program for that group of one or more execution threads.

11. The method of claim 1, wherein the data processor is a graphics processor and the program is a shader program.

12. A data processor, the data processor comprising:
a programmable execution unit operable to execute programs, and in which when executing a program, the programmable execution unit executes the program for respective groups of one or more execution threads, each execution thread in a group of one or more execution threads corresponding to a respective work item of an output being generated;
one or more slave units that can be used by the programmable execution unit when the programmable execution unit is executing a program to perform particular slave unit processing operations;
a thread group execution controller circuit that can issue groups of one or more execution threads for an output being generated to the programmable execution unit for execution to process the output being generated; and
a plurality of registers for storing data for execution threads executing a program, each execution thread when executing a program having an associated set of registers of the plurality of registers for storing data for the execution thread,
the data processor further comprising a processing circuit configured to, in response to a command to suspend the processing of an output being generated by the data processor that is received when a plurality of groups of one or more execution threads are currently executing a respective program for the output whose processing is to be suspended, to stop the processing of all of the groups of one or more execution threads that are currently executing a respective program for the output whose processing is to be suspended by:
for each group of one or more execution threads of the plurality of groups of one or more execution threads that are currently executing respective programs for the output being generated:
stop the issuing of program instructions for execution by the group of one or more execution threads;
wait for any outstanding transactions that affect the content of the registers associated with the threads of the group of one or more execution threads for the group of one or more execution threads to complete, wherein said outstanding transactions include any outstanding slave unit transactions corresponding to processing operations being performed by a respective slave unit and for which the results will be written to the registers associated with the threads of the group of one or more execution threads; and
when any outstanding transactions, including any outstanding slave unit transactions, that affect the content of the registers associated with the threads of the group of one or more execution threads for the group of one or more execution threads have completed:
store to memory:
the content of the registers associated with the threads of the group of one or more execution threads; and
a set of state information for the group of one or more execution threads, the set of state information including at least an indication of the last instruction in the program that was executed for the threads of the group of one or more execution threads;
such that the processing circuit is configured to, in response to the command to suspend the processing of an output being generated by the data processor:
for each group of one or more execution threads of the plurality of groups of one or more execution threads that are currently executing a respective program for the output whose processing is to be suspended: wait for any of said outstanding slave unit transactions for which the results will be written to the registers associated with the threads of the group of one or more execution threads to complete before storing to memory the set of state information for the group of one or more execution threads and the content of the registers associated with the threads of the group of one or more execution threads.

13. The data processor of claim 12, wherein the suspending of the processing for the output being generated is performed by and under the control of the driver for the data processor for the output that is being suspended.

14. The data processor of claim 12, wherein the processing circuit is configured to:
for each group of one or more execution threads of the plurality of groups of one or more execution threads that are currently executing a respective program for the output whose processing is to be suspended, store the content of the registers and the set of state information for the group of one or more execution threads to memory once any outstanding transactions that affect the content of the registers associated with the threads of the group of one or more execution threads for the group of one or more execution threads have completed, without waiting for any outstanding barrier dependencies for the group of one or more execution threads to be met.

15. The data processor of claim 12, wherein the processing circuit is configured to:
for each group of one or more execution threads of the plurality of groups of one or more execution threads that are currently executing a respective program for the output whose processing is to be suspended,
include in the set of state information that is stored for the thread group an indication of any outstanding barrier dependencies for the threads of the thread group at the time that the thread group was suspended.

16. The data processor of claim 12, wherein the processing circuit is configured to:
for each group of one or more execution threads of the plurality of groups of one or more execution threads that are currently executing a respective program for the output whose processing is to be suspended,
store the content of the registers and the set of state information for the group of one or more execution threads together in a suspend data buffer for the group of one or more execution threads.

17. The data processor of any one of claim 12, wherein the processing circuit is configured to:
for each group of one or more execution threads of the plurality of groups of one or more execution threads that are currently executing a respective program for the output whose processing is to be suspended,
store the register content and the state information for the thread group in the memory by executing a sequence of instructions that store the register content and the thread group state information in memory.

18. The data processor of any one of claim 12, wherein the processing circuit is configured to:
for each group of one or more execution threads of the plurality of groups of one or more execution threads that are currently executing a respective program for the output whose processing is to be suspended,
also store an indication that the thread group's processing has been suspended.

19. The data processor of any one of claim 12, wherein the processing circuit is configured to:
suspend the processing of a set of plural groups of one or more execution threads, the set of plural groups of one or more execution threads including the plurality of groups of one or more execution threads that are currently executing a respective program for the output whose processing is to be suspended; and
for each group of execution threads in the set, store a processing status of the thread group at the time the processing of the set of plural groups of one or more execution threads was suspended.

20. The data processor of claim 12, comprising a processing circuit configured to:
in response to receiving the command to resume processing of the suspended output:
for a thread group whose program execution was suspended partway through when processing of the output was suspended:
issue a corresponding group of one or more execution threads to the programmable execution unit to execute the program;
load the register content for the threads of the thread group that was written out when processing of the thread group was suspended to registers associated with threads of the issued thread group;
load the thread group state information for the thread group including at least the indication of the last instruction in the program that was executed for the threads of the thread group;
and, after the register content and thread group state data has been loaded:
resume execution of the program for the issued thread group after the indicated last instruction in the program that was executed for the threads of the thread group; and
use the loaded content of the registers for the threads of the thread group when executing the program for the issued thread group.

21. The data processor of claim 20, wherein the processing circuit is configured to:
in response to receiving the command to resume processing of the suspended output:
first identify one or more groups of one or more execution threads whose execution of a program for the suspended output was suspended when the processing of the output was suspended from a previously stored set of thread group suspend status indications for the output; and
then, for each such identified group of one of more execution threads, resume the execution of the program for that group of one or more execution threads.

22. The data processor of claim 12, wherein the data processor is a graphics processor and the program is a shader program.

23. A data processor, the data processor comprising:
a first programmable execution unit operable to execute programs, and in which when executing a program, the programmable execution unit executes the program for respective groups of one or more execution threads, each execution thread in a group of one or more execution threads corresponding to a respective work item of an output being generated; and
a plurality of registers for storing data for execution threads executing a program, each execution thread when executing a program having an associated set of registers of the plurality of registers for storing data for the execution thread;
the data processor further comprising a second execution unit that is different to the first programmable execution unit, the second execution unit comprising a processing circuit configured to, in response to a command to resume the processing of an output being generated by the data processor whose processing was previously suspended by execution of a program being stopped for all of a plurality of groups of one or more execution threads for the output being generated:
for each group of one or more execution threads of said plurality of groups of one or more execution threads whose execution of the program for the output whose processing is being resumed was stopped when the processing of the output was suspended:
issue a corresponding group of one or more execution threads to the first programmable execution unit to execute the program;
load from memory into registers associated with threads of the issued thread group a set of register content for the threads of the thread group that was written out to memory when processing of the thread group was suspended;

load from memory a set of thread group state information for the thread group including at least an indication of the last instruction in the program that was executed for the threads of the thread group when processing of the thread group was suspended; and after the register content and the thread group state data has been loaded:

resume execution of the program by the first programmable execution unit for the issued thread group after the indicated last instruction in the program that was executed for the threads of the thread group, wherein the first programmable execution unit uses the loaded content of the registers for the threads of the issued thread group when executing the program for the issued thread group;

such that the second programmable execution unit triggers the first programmable execution unit to resume execution of the program for all of said plurality of groups of one or more execution threads for the output whose processing is being resumed and whose processing was previously suspended by execution of the program being stopped for all of said plurality of groups of one or more execution threads.

24. A method of operating a data processor that includes a programmable execution unit operable to execute programs, and in which when executing a program, the programmable execution unit executes the program for respective groups of one or more execution threads, each execution thread in a group of execution threads corresponding to a respective work item of an output being generated, and each execution thread having an associated set of registers for storing data for the execution thread, the method comprising:

in response to a command sent by a first driver for the data processor to suspend the processing of an output being generated by the data processor:

for a group of one or more execution threads currently executing a program for the output being generated:

stopping the issuing of program instructions for execution by the group of one or more execution threads;

waiting for any outstanding transactions that affect the content of the registers associated with the threads of the group of one or more execution threads for the group of one or more execution threads to complete; and when any outstanding transactions that affect the content of the registers associated with the threads of the group of one or more execution threads for the group of one or more execution threads have completed:

storing to memory:

the content of the registers associated with the threads of the group of one or more execution threads; and a set of state information for the group of one or more execution threads, the set of state information including at least an indication of the last instruction in the program that was executed for the threads of the group of one or more execution threads;

wherein the suspending of the processing for the output being generated is performed by and under the control of the first driver for the data processor for the output that is being suspended, such that the first driver for the data processor retains control of the data processor until the suspending of the processing for the output being generated is completed;

and such that after the suspending of the processing for the output being generated is completed under the control of the first driver, the control of the data processor by the first driver can be relinquished to a second driver.

* * * * *

UNITED STATES PATENT AND TRADEMARK OFFICE
CERTIFICATE OF CORRECTION

| | | |
|---|---|---|
| PATENT NO. | : 11,830,101 B2 | Page 1 of 1 |
| APPLICATION NO. | : 16/931754 | |
| DATED | : November 28, 2023 | |
| INVENTOR(S) | : Olof Henrik Uhrenholt | |

It is certified that error appears in the above-identified patent and that said Letters Patent is hereby corrected as shown below:

In the Claims

Column 51, Line 26 (Claim 17, Line 1): please replace "of any one of claim" with --of claim--

Column 51, Line 36 (Claim 18, Line 1): please replace "of any one of claim" with --of claim--

Column 51, Line 44 (Claim 19, Line 1): please replace "of any one of claim" with --of claim--

Signed and Sealed this
Thirtieth Day of January, 2024

*Katherine Kelly Vidal*

Katherine Kelly Vidal
*Director of the United States Patent and Trademark Office*